US010720077B2

(12) United States Patent
Vengroff et al.

(10) Patent No.: US 10,720,077 B2
(45) Date of Patent: Jul. 21, 2020

(54) AUXILIARY BUTTON FOR A COOKING SYSTEM

(71) Applicant: Meyer Intellectual Properties Limited, Kowloon (HK)

(72) Inventors: Darren Erik Vengroff, Seattle, WA (US); Christoph Milz, Vallejo, CA (US)

(73) Assignee: Meyer Intellectual Properties Ltd. (VG)

( * ) Notice: Subject to any disclaimer, the term of this patent is extended or adjusted under 35 U.S.C. 154(b) by 282 days.

(21) Appl. No.: 15/436,166

(22) Filed: Feb. 17, 2017

(65) Prior Publication Data

US 2017/0243515 A1    Aug. 24, 2017

Related U.S. Application Data

(60) Provisional application No. 62/297,136, filed on Feb. 18, 2016.

(51) Int. Cl.
*H05B 1/02* (2006.01)
*G09B 19/00* (2006.01)
(Continued)

(52) U.S. Cl.
CPC ........ *G09B 19/0092* (2013.01); *A47J 36/321* (2018.08); *A47J 37/108* (2013.01);
(Continued)

(58) Field of Classification Search
CPC ..... G09B 19/0092; A47J 36/321; A47J 27/62; A47J 37/108; F24C 3/12; F24C 7/08;
(Continued)

(56) References Cited

U.S. PATENT DOCUMENTS 3,742,178 A    6/1973 Harnden, Jr.
4,381,438 A    4/1983 Goessler et al.
(Continued)

FOREIGN PATENT DOCUMENTS

CA    3016142       8/2017
CN    2730052 Y    9/2005
(Continued)

OTHER PUBLICATIONS https://devzone.nordicsemi.com/tutorials/5/.
(Continued)

*Primary Examiner* — Mark H Paschall
(74) *Attorney, Agent, or Firm* — Akerman LLP

(57) ABSTRACT

According to one example, a system includes a computing device having a processor that is operable to display a first portion of a cooking recipe. The system further includes a heat source system having a heat source operable to provide an amount of energy to be used to cook a food item in accordance with the cooking recipe, and a processor operable to adjust the amount of energy provided by the heat source based on one or more communications with the computing device. The system further includes an auxiliary button system having an interface operable to receive an instruction to move from a first step of the cooking recipe to a second step, and a processor operable to transmit, via a second communication link with the computing device, an indication of the instruction.

12 Claims, 15 Drawing Sheets

(51) Int. Cl.
- *A47J 37/10* (2006.01)
- *G09B 5/06* (2006.01)
- *G06F 3/02* (2006.01)
- *A47J 36/32* (2006.01)
- *G06Q 10/10* (2012.01)
- *G06Q 50/12* (2012.01)
- *F24C 3/12* (2006.01)
- *F24C 7/08* (2006.01)
- *G09B 5/02* (2006.01)

(52) U.S. Cl.
CPC .............. *F24C 3/12* (2013.01); *F24C 7/08* (2013.01); *G06F 3/0227* (2013.01); *G06Q 10/10* (2013.01); *G06Q 50/12* (2013.01); *G09B 5/02* (2013.01); *G09B 5/06* (2013.01)

(58) Field of Classification Search
CPC ...... H05B 1/02; H05B 1/0266; H05B 1/0261; H05B 3/0076
USPC ....... 219/490, 494, 412, 413, 414, 497, 506, 219/702, 710, 713, 714, 720
See application file for complete search history.

(56) References Cited

U.S. PATENT DOCUMENTS

| | | |
|---|---|---|
| 5,441,344 A | 8/1995 | Cook, III |
| 5,746,114 A | 5/1998 | Harris |
| 5,951,900 A | 9/1999 | Smrke |
| 6,170,509 B1 | 1/2001 | Karta |
| 6,206,564 B1 | 3/2001 | Adamczewski |
| 6,462,316 B1 | 10/2002 | Berkcan et al. |
| 6,578,469 B2 | 6/2003 | Sharpe |
| 6,591,739 B2 | 7/2003 | Norcross |
| 6,630,650 B2 | 10/2003 | Bassill et al. |
| 6,795,421 B1 | 9/2004 | Heinonen et al. |
| 7,156,367 B1 | 1/2007 | Huang et al. |
| 7,409,765 B2 | 8/2008 | So |
| 7,602,754 B2 | 10/2009 | Heinonen et al. |
| 8,588,688 B2 | 11/2013 | Reunamaki et al. |
| 8,692,162 B2 | 4/2014 | Elston et al. |
| 8,737,917 B2 | 5/2014 | Desai et al. |
| 8,800,542 B1 | 8/2014 | Kennington |
| 8,817,717 B2 | 8/2014 | Ly-Gagnon et al. |
| 8,976,158 B2 | 3/2015 | Eriksson et al. |
| 8,992,225 B2 | 3/2015 | Do |
| 9,185,652 B2 | 11/2015 | Kie et al. |
| 9,258,695 B2 | 2/2016 | Kasslin et al. |
| 9,357,342 B2 | 5/2016 | Viswanadham et al. |
| 9,414,217 B2 | 8/2016 | Knaappila |
| 9,456,295 B2 | 9/2016 | Choi et al. |
| 9,538,356 B2 | 1/2017 | Hughes et al. |
| 9,544,755 B2 | 1/2017 | Palin et al. |
| 9,702,858 B1* | 7/2017 | Minvielle ............... G01N 33/02 |
| 10,085,584 B2 | 10/2018 | Johncock et al. |
| 2003/0028688 A1 | 2/2003 | Tiphane et al. |
| 2003/0037681 A1 | 2/2003 | Zhu et al. |
| 2004/0016348 A1 | 1/2004 | Shame |
| 2004/0221046 A1 | 11/2004 | Heinonen et al. |
| 2006/0016800 A1 | 1/2006 | Paradiso et al. |
| 2006/0234177 A1 | 10/2006 | Yu et al. |
| 2007/0221668 A1* | 9/2007 | Baarman ............... H05B 6/062 219/746 |
| 2008/0055241 A1 | 3/2008 | Goldenberg |
| 2009/0293166 A1 | 12/2009 | Shayne |
| 2010/0156645 A1 | 6/2010 | Beck |
| 2010/0187224 A1* | 7/2010 | Hyde ............... H05B 6/705 219/720 |
| 2011/0021142 A1 | 1/2011 | Desai et al. |
| 2011/0044370 A1 | 2/2011 | Schochet |
| 2011/0148773 A1 | 6/2011 | Rudolph |
| 2011/0253693 A1 | 10/2011 | Lyons et al. |
| 2012/0000903 A1 | 1/2012 | Baarman |
| 2012/0111852 A1 | 5/2012 | Bach |
| 2012/0175539 A1 | 7/2012 | Nebbia et al. |
| 2012/0186459 A1 | 7/2012 | Tisselli et al. |
| 2012/0190302 A1 | 7/2012 | Reunamaki et al. |
| 2012/0281638 A1 | 11/2012 | Ly-Gagnon et al. |
| 2013/0003490 A1 | 1/2013 | Kemker et al. |
| 2013/0003630 A1 | 1/2013 | Xhafa et al. |
| 2013/0112683 A1 | 5/2013 | Hegedis et al. |
| 2013/0165044 A1 | 6/2013 | Xie et al. |
| 2013/0171304 A1 | 7/2013 | Huntley |
| 2014/0033928 A1 | 2/2014 | Broders |
| 2014/0039650 A1 | 2/2014 | Baraille et al. |
| 2014/0113039 A1 | 4/2014 | Barkhouse |
| 2014/0120219 A1 | 5/2014 | Ewell, Jr. et al. |
| 2014/0132643 A1 | 5/2014 | Yamakazi et al. |
| 2014/0234496 A1 | 8/2014 | Siegel et al. |
| 2014/0292536 A1 | 10/2014 | Barth et al. |
| 2014/0321321 A1 | 10/2014 | Knaappila |
| 2014/0345474 A1 | 11/2014 | Trench Rocha et al. |
| 2014/0356495 A1 | 12/2014 | Teuscher |
| 2015/0066516 A1 | 3/2015 | Nishikawa et al. |
| 2015/0153048 A1 | 6/2015 | Moro |
| 2015/0172391 A1 | 6/2015 | Kasslin et al. |
| 2015/0172901 A1 | 6/2015 | Kasslin et al. |
| 2015/0172902 A1 | 6/2015 | Kasslin et al. |
| 2015/0208845 A1 | 7/2015 | Robbins et al. |
| 2015/0208858 A1 | 7/2015 | Robbins et al. |
| 2015/0292749 A1 | 10/2015 | Kim et al. |
| 2015/0374162 A1 | 12/2015 | Nonaka et al. |
| 2016/0029149 A1 | 1/2016 | Morikawa et al. |
| 2016/0037966 A1 | 2/2016 | Chin et al. |
| 2016/0051078 A1 | 2/2016 | Jenkins et al. |
| 2016/0095169 A1 | 3/2016 | Sanchez |
| 2016/0113438 A1 | 4/2016 | Hanson et al. |
| 2016/0198885 A1 | 7/2016 | Logan et al. |
| 2016/0234206 A1 | 8/2016 | Tunnell et al. |
| 2016/0372005 A1 | 12/2016 | Bajpai |
| 2016/0374501 A1 | 12/2016 | Logan |
| 2017/0150841 A1 | 6/2017 | Johncock |
| 2017/0238749 A1 | 8/2017 | Vengroff et al. |
| 2017/0238751 A1 | 8/2017 | Vengroff |
| 2018/0199761 A1 | 7/2018 | Gogorza Segurola |
| 2018/0242772 A1 | 8/2018 | Jenkins |
| 2018/0310759 A1 | 11/2018 | Jenkins |
| 2018/0310760 A1* | 11/2018 | Jenkins ............... A47J 36/321 |
| 2019/0104572 A1* | 4/2019 | Clark ............... A47J 31/4492 |
| 2019/0125120 A1 | 5/2019 | Jenkins |

FOREIGN PATENT DOCUMENTS

| | | |
|---|---|---|
| CN | 101273834 | 10/2008 |
| CN | 103792859 | 5/2014 |
| CN | 104161443 | 11/2014 |
| CN | 104490249 A | 4/2015 |
| CN | 104913351 A | 9/2015 |
| CN | 204611856 U | 9/2015 |
| CN | 105003936 A | 10/2015 |
| CN | 204862574 | 12/2015 |
| DE | 4405610 | 8/1995 |
| DE | 20 2014 004 271 | 8/2014 |
| EP | 725556 | 2/2007 |
| EP | 1758431 | 2/2007 |
| EP | 2312218 | 4/2011 |
| FR | 2945608 | 11/2010 |
| JP | S60-23724 A | 2/1985 |
| JP | 11-51385 | 2/1999 |
| JP | 2006-105557 | 4/2006 |
| JP | 2007194100 | 8/2007 |
| JP | 2010-192274 | 9/2010 |
| JP | 2015-050766 A | 3/2015 |
| TW | M5052732 | 7/2015 |
| WO | 99/41950 | 8/1999 |
| WO | 200101432 | 1/2001 |
| WO | 2008119207 | 10/2008 |
| WO | 2008/154763 A1 | 12/2008 |
| WO | 2011/113334 A1 | 9/2011 |
| WO | 2012006674 | 1/2012 |
| WO | 2012/092863 A1 | 7/2012 |
| WO | 2013175441 A1 | 11/2013 |
| WO | 2012124349 | 7/2014 |

(56) References Cited

FOREIGN PATENT DOCUMENTS

| WO | 2015128578 | 9/2015 |
| WO | 2015135031 | 9/2015 |
| WO | 2015136205 | 9/2015 |
| WO | 2016/028921 A1 | 2/2016 |

OTHER PUBLICATIONS http://www.blendtec.com/blenders/designer-725.
http://www.goodhousekeeping.com/appliances/blender-reviews/a33140/blendtec-designer-725/.
PCT International Search Report and Written Opinion for PCT/US2017/018310 dated May 24, 2017.
PCT International Search Report and Written Opinion for PCT/US2017/018425 dated Jun. 1, 2017.
PCT International Search Report and Written Opinion for PCT/US2017/018365 dated May 24, 2017.
Office Action for U.S. Appl. No. 14/830,581 dated Jun. 28, 2017.
Examiner's Report issued in connection with corresponding Canadian Patent Application No. 3,015,698, dated May 31, 2019.
Examination Report issued in connection with corresponding Australian Patent Application No. 2017220091, dated Nov. 29, 2018.
Notice of Office Action issued in connection with corresponding Korean Patent Application No. 10-2018-7023911, dated Sep. 23, 2019.
Examiner's Report dated Dec. 12, 2018 issued in Australian Patent Application No. 2017220032.
Examiner's Report dated Jun. 20, 2019 issued in Canadian Patent Application No. 3,016,142.
Examiner's Report dated Nov. 19, 2018 issued in connection with corresponding AU Application No. 2017220002.
International Search Report and Written Opinion dated Feb. 11, 2019 for PCT/U52018/058486.
Extended European Search Report dated Nov. 19, 2019 for European Patent Application No. 17753891.5.
Office Action issued in Korean Patent Application 10-2018-7027033 dated Aug. 26, 2019.
Official Letter dated Jul. 18, 2018 issued in Taiwan Application No. 106202377.
Office Action issued in Taiwan application 106105451 dated Jul. 16, 2018 with translation.
International Search Report and Written Opinion dated Aug. 14, 2018 for PCT/US2018/029919.
Examiner's Report dated May 31, 2019 issued in Canadian Patent Application No. 3,015,698.
International Search Report and Written Opinion dated Jan. 27, 2016 issued for PCT/US2015/045944.
First Examination Report dated Nov. 3, 2017 issued in New Zealand Patent Application No. 729778.
Examination Report No. 1 dated Dec. 19, 2017 issued in Australian Patent Application No. 2015305556.
Examiner's Report dated Jan. 29, 2018 issued in Canadian Patent Application No. 2,957,723.
Further Examination Report dated Mar. 19, 2018 issued in New Zealand Patent Application No. 729778.
Notice of Reasons for Refusal dated May 1, 2018 issued in Japanese Patent Application No. 2017-508687, along with English translation.
International Preliminary Report on Patentability dated Jan. 21, 2017 for PCT/US2015/045944.
International Search Report and Written Opinion dated Jun. 28, 2018 for PCT/US2018/029824.
"Pantelligent: Intelligent Pan—Cook Everything Perfectly" https://www.kickstarter.com/projects/hevans/pan-cook-everything-perfe/description.
"Paragon /Indiegogo: Pre-Order your Paragon on Indiegogo today" http://paragon.webflow.io/.
Wall, Alix Smart Pan Creator Hopes to Revolutinize Cooking with "Smarty Pans" http://ww2.kqed.org/bayareabites/2014/09/25/Smart-Pan-Creator-Hopes-to-Revolutinize-Cooking-with-smartypans/.
Notice of Reasons for Refusal issued in Japanese Patent Application 2018-543655 dated Sep. 3, 2019.
Extended European Search Report dated Sep. 23, 2019 for European Patent Application No. 17753923.6.
Extended European Search Report dated Jul. 23, 2019 for European Patent Application No. 17753947.5.
Notice of Reasons for Refusal dated Jun. 25, 2019 issued in corresponding Japanese Patent Application No. 2018-543623, along with English translation.
Notice of Reasons for Refusal dated Sep. 19, 2019 issued in Japanese Patent Application No. 2018-208919, along with English translation.
Office Action issued in corresponding Taiwan Application No. 106105451 dated Mar. 9, 2018 with translation.
Wikipedia contributors (2019 Sep. 27) "Mac address" Wikipedia, The Free Encyclopedia. Retrieved 01:55, Oct. 2, 2019 from https://en.wikipedia.org/w/index.php?title=MAC_adddress&oldid=918173830 (Year:2019).
Examiner's Report dated May 1, 2019 issued in Canadian Patent Application No. 3,015,304.
First Office Action and Search Report dated Jan. 16, 2019 issued in Chinese Patent Application No. 201710094388X with English translations.
Second Office Action dated Sep. 29, 2019 issued in Chinese Patent Application No. 201710094388X with English translation.
"Impact of Multiple Inquirers on the Bluetooth Discovery Process" by Anne Franssens; Jul. 2010: Retrieved from the Internet Oct. 2, 2019 from https://essay.utwente.nl/59681/1/MA_scriptie_A_Frassens.pdf (Year: 2010). —.
Search Report and Written Opinion dated Jan. 9, 2020 issued in Singapore Patent Application No. 11201807308T.
Search Report and Written Opinion dated Jan. 7, 2020 issued in Singapore Patent Application No. 11201806971Q.
Search Report and Written Opinion dated Jan. 9, 2020 issued in Singapore Patent Application No. 11201806970V.
First Office Action issued in Chinese Patent Application No. 2015105125493 with English Translation.
Search Report issued in Chinese Patent Application No. 2015105125493 with English Translation.
Examiner's Report dated Feb. 19, 2020 issued in Canadian Patent Application No. 3,015,698.
Examiner's Report dated Feb. 5, 2020 issued in Canadian Patent Application No. 3,015,304.
Notification of Reasons for Refusal dated Feb. 10, 2020 issued in connection with corresponding Japanese Patent Application No. 2018-543623.
Notice of Allowance dated Mar. 25, 2020 issued in connection with corresponding Korean Patent Application No. 10-2018-7023911.
Office Action dated Mar. 10, 2020 issued in connection with corresponding European Patent Application No. 17753947.5.
Notification of the First Office Action dated Jun. 3, 2020 issued in connection with corresponding Chinese Patent Application No. 2017800239809.
Search Report dated May 26, 2020 issued in connection with corresponding Chinese Patent Application No. 2017800239809.

* cited by examiner

AUXILIARY BUTTON FOR A COOKING SYSTEM

CROSS-REFERENCE TO RELATED APPLICATIONS

This application claims priority to U.S. Provisional Patent Application No. 62/297,136 filed Feb. 18, 2016, the entirety of which is incorporated herein by reference.

TECHNICAL FIELD

This disclosure relates generally to the field of cooking appliances and more specifically to wirelessly controlled cooking systems.

BACKGROUND

Traditionally, a user has cooked food by manually turning on a heat source using a knob, placing the food over the heat source, and estimating (or measuring or timing) when the food is done cooking. Such traditional cooking techniques, however, may be deficient.

SUMMARY

A first aspect of the invention is achieved by a system, comprising: a computing device having a processor that is operable, when executed, to: display a first portion of a cooking recipe having a plurality of steps, the first portion of the cooking recipe being associated with a first step of the cooking recipe; establish a first communication link with a heat source system to be used to cook a food item in accordance with the cooking recipe; the heat source system, comprising: a heat source operable to provide an amount of energy to be used to cook the food item in accordance with the cooking recipe; and a processor communicatively coupled to the heat source, and operable, when executed, to: receive, via the first communication link with the computing device, an indication of a first temperature associated with the first step of the cooking recipe; and based on the indication of the first temperature, adjust the amount of energy provided by the heat source; an auxiliary button system, comprising: an interface operable to receive an instruction to move from the first step of the cooking recipe to a second step of the cooking recipe; and a processor communicatively coupled to the interface, and operable, when executed, to: establish a second communication link with the computing device; and transmit, via the second communication link with the computing device, an indication of the instruction to move from the first step of the cooking recipe to the second step of the cooking recipe; and wherein the processor of the computing device is further operable to: receive, via the second communication link with the auxiliary button system, the indication of the instruction to move from the first step of the cooking recipe to the second step of the cooking recipe; and following receipt of the indication of the instruction, display a second portion of the cooking recipe, the second portion of the cooking recipe being associated with the second step of the cooking recipe.

Another aspect of the invention is any such system, wherein the processor of the heat source system is further operable, when executed, to: receive, via the first communication link with the computing device, an indication of a second temperature associated with the second step of the cooking recipe; and based on the indication of the second temperature, further adjust the amount of energy provided by the heat source.

A second aspect of the invention is achieved by a system, comprising: a computing device having a processor that is operable, when executed, to display a first portion of a cooking recipe having a plurality of steps, the first portion of the cooking recipe being associated with a first step of the cooking recipe; a heat source system, comprising: a heat source operable to provide an amount of energy to be used to cook a food item in accordance with the cooking recipe; and a processor communicatively coupled to the heat source, and operable, when executed, to adjust the amount of energy provided by the heat source based on one or more communications with the computing device via a first communication link; and an auxiliary button system, comprising: an interface operable to receive an instruction to move from the first step of the cooking recipe to a second step of the cooking recipe; and a processor communicatively coupled to the interface, and operable, when executed, to transmit, via a second communication link with the computing device, an indication of the instruction to move from the first step of the cooking recipe to the second step of the cooking recipe.

Another aspect of the invention is any such system, wherein the processor of the computing device is further operable to: receive, via the second communication link with the auxiliary button system, the indication of the instruction to move from the first step of the cooking recipe to the second step of the cooking recipe; and following receipt of the indication of the instruction, display a second portion of the cooking recipe, the second portion of the cooking recipe being associated with the second step of the cooking recipe.

Another aspect of the invention is any such system, wherein the processor of the heat source system is further operable, when executed, to further adjust the amount of energy provided by the heat source based on one or more additional communications with the computing device via the first communication link.

Another aspect of the invention is any such system, wherein the auxiliary button system further comprises: an auxiliary device that is separate from the computing device; and an auxiliary button module coupled to the auxiliary device, the auxiliary button module including the interface.

Another aspect of the invention is any such system, wherein the auxiliary button module is integrated with the auxiliary device.

Another aspect of the invention is any such system, wherein the auxiliary button module further includes the processor of the auxiliary button system, wherein the auxiliary button module is removable from the auxiliary device and operable to be used as a standalone device.

Another aspect of the invention is any such system, wherein the auxiliary device comprises a cooking appliance, a cooking vessel, a cooking surface, a cooking utensil, a support system, an auxiliary display, or a wearable device.

Another aspect of the invention is any such system, wherein the auxiliary device comprises the heat source system.

Another aspect of the invention is any such system, wherein at least a portion of the auxiliary button system is washable with water.

Another aspect of the invention is any such system, wherein the processor of the computing device is further operable, when executed, to display the first portion of the cooking recipe on a display of the computing device or on an auxiliary display separate from the computing device.

Another aspect of the invention is any such system, wherein the second step of the cooking recipe is a step that is subsequent to the first step of the cooking recipe or prior to the first step of the cooking recipe.

A third aspect of the invention is achieved by a method, comprising: displaying, by a processor of a computing device, a first portion of a cooking recipe having a plurality of steps, the first portion of the cooking recipe being associated with a first step of the cooking recipe; establishing, by the processor of the computing device, a first communication link with a heat source system, the heat source system having a heat source that is operable to provide an amount of energy to be used to cook a food item in accordance with the cooking recipe; establishing, by the processor of the computing device, a second communication link with an auxiliary button system, the auxiliary button system having an interface that is operable to receive an instruction to move from the first step of the cooking recipe to a second step of the cooking recipe; transmitting, by the processor of the computing device and via the first communication link, one or more communications to the heat source system so as to cause the heat source system to adjust the amount of energy provided by the heat source in accordance with the cooking recipe; and receiving, by the processor of the computing device and via the second communication link, an indication of the instruction to move from the first step of the cooking recipe to the second step of the cooking recipe.

Another aspect of the invention is any such method, further comprising, following receipt of the indication of the instruction, displaying, by the processor of the computing device, a second portion of the cooking recipe, the second portion of the cooking recipe being associated with the second step of the cooking recipe.

Another aspect of the invention is any such method, further comprising, following receipt of the indication of the instruction, transmitting, by the processor of the computing device and via the first communication link, one or more additional communications to the heat source system so as to cause the heat source system to further adjust the amount of energy provided by the heat source in accordance with the cooking recipe.

Another aspect of the invention is any such method, wherein the auxiliary button system comprises: an auxiliary device that is separate from the computing device; and an auxiliary button module coupled to the auxiliary device, the auxiliary button module including the interface.

Another aspect of the invention is any such method, wherein the auxiliary button module is integrated with the auxiliary device.

Another aspect of the invention is any such method, wherein the auxiliary button module is removable from the auxiliary device and operable to be used as a standalone device.

Another aspect of the invention is any such method, wherein the auxiliary device comprises a cooking appliance, a cooking vessel, a cooking surface, a cooking utensil, a support system, an auxiliary display, or a wearable device.

A fourth aspect of the invention is achieved by a system, comprising: a computing device having a processor that is operable, when executed, to: display at least a portion of a cooking recipe; and transmit, via a first wireless communication link, one or more communications associated with the cooking recipe to a heat source system so as to assist in cooking a food item in accordance with the cooking recipe; and an auxiliary button system that is separate from the computing device, the auxiliary button system comprising: an interface operable to receive an instruction associated with the cooking recipe; and a processor communicatively coupled to the interface, and operable when executed, to transmit, via a second wireless communication link with the computing device, an indication of the instruction associated with the cooking recipe.

A fifth aspect of the invention is achieved by an auxiliary button system operable to provide a user indicated instruction to a wireless device to interface with the electronic cookbook executed on the wireless device, the auxiliary button system comprising: an auxiliary button module for use with an auxiliary button system, the auxiliary button module comprising an interface through which a user may indicate an operation instruction.

Another aspect of the invention is any such system, wherein the interface comprises an actuator.

Another aspect of the invention is any such system, wherein the actuator is a switch.

Another aspect of the invention is any such system, wherein the interface comprises a touch screen.

Another aspect of the invention is any such system, wherein the interface comprises a microphone.

Another aspect of the invention is any such system, wherein the interface comprises a motion sensor.

Another aspect of the invention is any such system, wherein the interface comprises a capacitance sensor.

Another aspect of the invention is any such system, further comprising an operation circuitry operatively coupled with the interface to electrically receive the indicated operation from the interface.

Another aspect of the invention is any such system, wherein the operation circuitry comprises a transducer.

Another aspect of the invention is any such system, wherein the interface comprises a lighted display and the operation circuitry comprises a capacitance sensor.

Another aspect of the invention is any such system, wherein the interface comprises a touch screen and the operation circuitry comprises a capacitance sensor.

Another aspect of the invention is any such system, wherein the operation circuitry comprises an audio sensor.

Another aspect of the invention is any such system, wherein the operation circuitry comprises a motion sensor.

Another aspect of the invention is any such system, wherein the operation circuitry comprises a light sensor.

Another aspect of the invention is any such system, wherein the operation circuitry comprises a thermal sensor.

Another aspect of the invention is any such system, wherein the operation circuitry comprises a capacitance sensor.

Another aspect of the invention is any such system, further comprising a communication circuitry configured to transmit the indicated operation received by the operation circuitry to a wireless device comprising a processor and memory storing instructions executable by the processor to perform an electronic cookbook, wherein performance of the electronic cookbook comprises wireless control of a heating source system by the wireless device.

Another aspect of the invention is any such system, wherein the communication circuitry is configured to transmit the indicated operation to the wireless device via a wired connection.

Another aspect of the invention is any such system, wherein the communication circuitry is configured to transmit the indicated operation to the wireless device via a wireless connection.

Another aspect of the invention is any such system, wherein the wireless connection comprises a Bluetooth connection.

Another aspect of the invention is any such system, wherein the wireless connection comprises signals transmitted by the communication circuitry comprising on or more signals selected from radio, cellular, IR, Bluetooth, or combination thereof.

Another aspect of the invention is any such system, wherein the auxiliary button module is integrated with an auxiliary device.

Another aspect of the invention is any such system, wherein the auxiliary device comprises a cooking appliance, cooking utensil, cooking vessel, cooking surface, electronic cookbook support, auxiliary display, or wearable device.

Another aspect of the invention is any such system, wherein the auxiliary device is a cooking appliance comprising a refrigerator, oven, range, grill, scale, slow cooker, dishwasher, or microwave.

Another aspect of the invention is any such system, wherein the auxiliary device is a cooking utensil comprising a spoon, fork, tongs, or knife.

Another aspect of the invention is any such system, wherein the auxiliary device is a cooking vessel comprising a pan, skillet, or slow cooker vessel.

Another aspect of the invention is any such system, wherein the auxiliary device is a cooking surface comprising a cutting board or countertop.

Another aspect of the invention is any such system, wherein the auxiliary device is an electronic cookbook support comprising a stand or case.

Another aspect of the invention is any such system, wherein the auxiliary device is an auxiliary display comprising glasses, a projector, or a display associated with a kitchen appliance.

Another aspect of the invention is any such system, wherein the auxiliary device is a wearable device comprising a watch, apron, or belt.

Another aspect of the invention is any such system, wherein the auxiliary button module comprises a fitting configured for attachment at an attachment site associated with a device body of the auxiliary device.

Another aspect of the invention is any such system, wherein the auxiliary button module comprises a fitting configured for removable attachment at an attachment site associated with a device body of the auxiliary device.

Another aspect of the invention is any such system, wherein the auxiliary button module comprises a fitting configured for removable operational attachment at an attachment site associated with a device body of the auxiliary device.

Another aspect of the invention is any such system, wherein the fitting comprises an electrical connector.

Another aspect of the invention is any such system, wherein when the auxiliary button is attached to the device body, the electrical connector electrically connects to the auxiliary button module to provide or complete a power source, operation circuitry, communication circuitry, or combination thereof.

Another aspect of the invention is any such system, wherein the auxiliary button module is machine washable.

Another aspect of the invention is any such system, wherein the auxiliary button module is sink washable.

Another aspect of the invention is any such system, wherein the auxiliary button module is spray washable.

Another aspect of the invention is any such system, further comprising a removable interface cover, wherein the interface is operable to receive the user indicated operation instruction from the user wherein the removable interface cover covers the interface.

Another aspect of the invention is any such system, wherein the removable interface cover is machine washable.

A sixth aspect of the invention is achieved by a cooking system, comprising: a food heating appliance comprising a wireless transmission means, and a wireless means to receive a control signal that is operative to modulate the thermal output of the heating appliance, a user interface, and a sensor to detect one of a food temperature and a food appliance temperature; and a display device comprising memory to store one or more recipes for cooking food, an electronic display that is operative to display or highlight a sequence of stages in the stored recipe, and a means to receive to receive an output of at least one of the sensor and the food heating appliance, wherein the user interface of the food heating appliance is operative to advance through the sequence of steps in the recipe.

A seventh aspect of the invention is achieved by a food heating appliance having a means to control a device that displays or controls the steps to be executed by the user or the heating appliance.

An eighth aspect of the invention is achieved by a process of cooking using a cooking system, the process comprising: activating the user interface on a food heating appliance; and wherein said step of activating comprises touching or actuating an auxiliary button operative to modify the recipe display.

A ninth aspect of the invention is achieved by an auxiliary button system comprising: a food heating appliance comprising a wireless transmission means and a wireless means to receive a control signal that is operative to modulate the thermal output of the heating appliance, a user interface, and a sensor to detect one of a food temperature and a food appliance temperature; and a display device comprising memory storage of one or more recipes for cooking food, an electronic display that is operative to display or highlight a sequence of stages in the recipe, and a means to receive an output of at least one of the sensor and the food heating appliance, wherein the user interface of the food heating appliance is operative to advance through the sequence of steps in the recipe displayed by the display device.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the present disclosure are best understood by referring to FIGS. 1A-28 of the drawings, like numerals being used for like and corresponding parts of the various drawings.

Figure 1A:
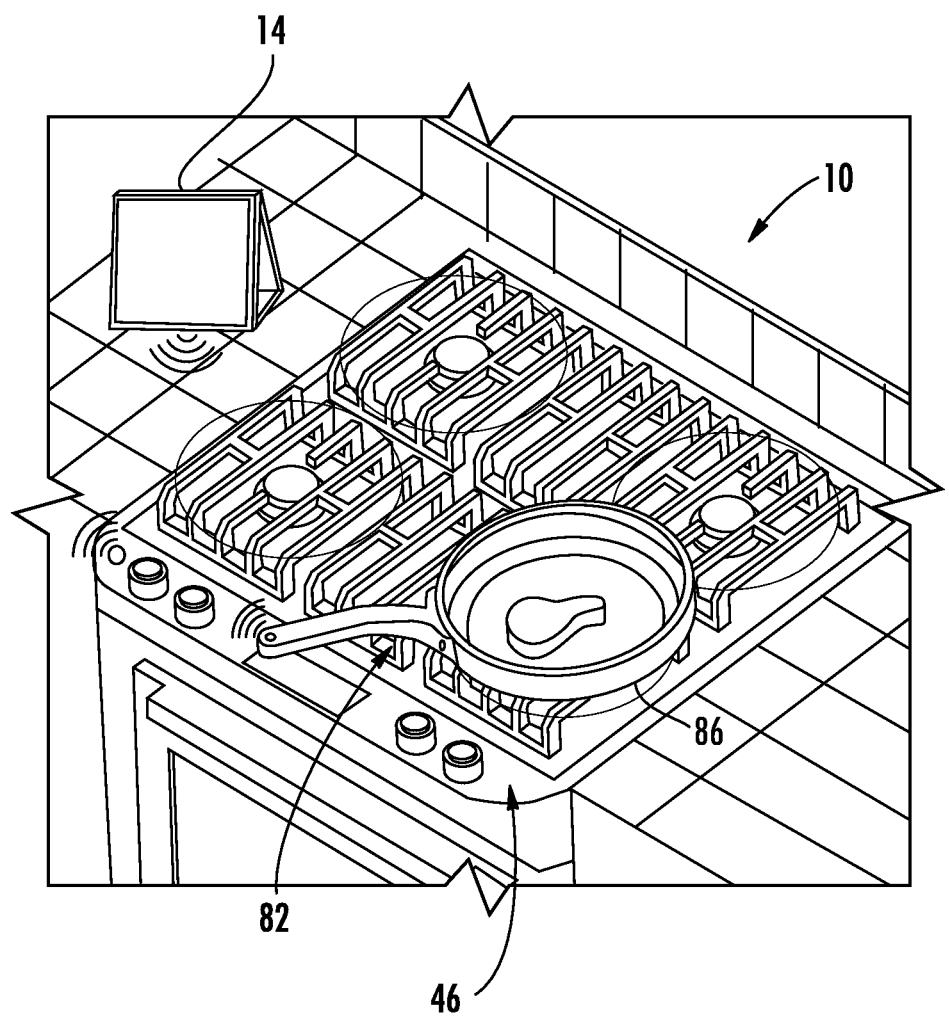
FIGS. 1A-1B illustrate an example cooking system that may assist a user in cooking a food item according to various embodiments.
Figure 1B:
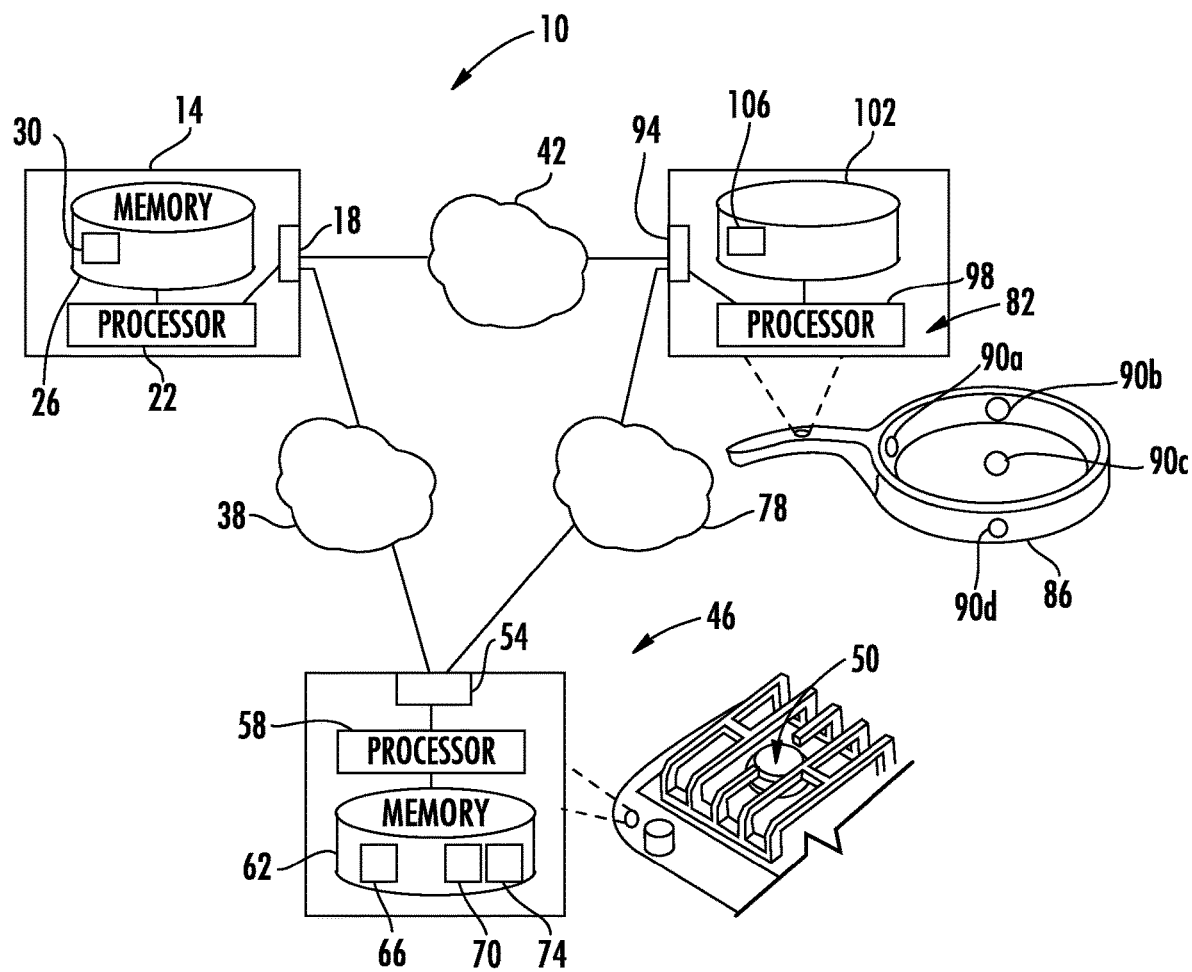

FIGS. 1A-1B illustrate an example cooking system 10 that may assist a user in cooking a food item (such as a steak or chili). As is illustrated, the cooking system 10 includes a wireless device 14 (such as a mobile phone or tablet) that may execute an electronic cookbook 30. Additionally, the cooking system 10 includes a heat source system 46 (such as a gas burner system, an electric burner system or an induction burner system) and a cooking device system (such as a cooking pan or pot) to be used in cooking the food item.

In one example of operation of FIGS. 1A-1B, a user may desire to cook a food item, such as a steak or chili. To do so, the user may utilize their wireless device 14 (such as their mobile phone or tablet) to select a particular recipe for the food item displayed by the electronic cookbook 30 on the wireless device 14. Based on the selection, the wireless device 14 may establish a first communication link (such as a Bluetooth communication link or a WiFi communication link) with the heat source system 46 (such as a stove top) to be used in cooking the food item. In one embodiment, the first communication link with the heat source system 46 may be a wired connection (e.g., via a USB or serial connection).

The wireless device 14 may use this communication link to transmit cooking instructions 70 to the heat source system 46. The cooking instructions 70 may include a particular temperature (such as 375° F.) and a particular duration of time (such as 10 minutes). These cooking instructions 70 may cause the heat source 50 (such as the front left gas burner of the stove top) of the heat source system 46 to begin providing energy to the cooking device 86 (such as a 5 quart pot) of the cooking device system 82. For example, the cooking instructions 70 may cause the heat source 50 to provide a flame (or other source of energy) having an intensity that varies over time so as to raise the temperature of the cooking device 86 to the desired cooking temperature (such as 375° F.) and then maintain that particular temperature (such as 375° F.) for the duration of the cooking process. Furthermore, the cooking instructions 70 may further cause the heat source 50 to provide such a flame for the particular duration of time (such as 10 minutes), adjusting the intensity of the flame algorithmically to maintain the desired cooking temperature throughout the process.

In addition to the first communication link between the wireless device 14 and the heat source system 46, the heat source system 46 may establish a second communication link (such as a second Bluetooth communication link or a second Wi-Fi communication link) with the cooking device system 82. The cooking device system 82 may utilize the second communication link to transmit measurement information 74 to the heat source system 46. For example, the cooking device system 82 may measure a current temperature associated with the food item, and may communicate this current temperature to the heat source system 46 as the measurement information 74. Based on the measurement information 74, the heat source system 46 may make one or more changes or adjustments to the amount of energy provided by the heat source 50. For example, if the measurement information 74 indicates that the current cooking temperature is below the intended temperature of 375° F., the heat source system 46 may increase the amount of energy provided by the heat source 50. As another example, if the measurement information 74 indicates that the current cooking temperature is above the intended temperature of 375° F., the heat source system 46 may decrease the amount of energy provided by heat source 50. As a further example, if the measurement information 74 indicates that the current cooking temperature is at the intended temperature of 375° F., the heat source system 46 may continue to provide the same amount of energy. As a further example, if the measurement information 74 indicates that the current cooking temperature is below the intended temperature of 375° F. but rising rapidly in a such a manner that it is likely to overshoot the intended temperature, the heat source system 46 may decrease the amount of energy provided by the heat source 50. As a further example, the heat source system 46 may make any of a variety of adjustments to the amount of energy provided by the heat source based on the operation of a feedback or feed forward algorithm (for example a proportional-integral-derivative (PID) algorithm) on a series of temperature measurements or other measurement information 74. Example PID algorithms for use in cooking are described in U.S. Pat. No. 8,692,162 entitled "Oven control utilizing data-driven logic", and U.S. Pat. No. 8,800,542 entitled "Automatic temperature control device for solid fuel fired food cooker," both of which are incorporated herein by reference.

In some examples, the user who is cooking the food item may desire to leave the kitchen while the food item is cooking. Furthermore, the user may take their wireless device 14 (such as their mobile phone) with them. This may, in some examples, cause the wireless device 14 to move out of communication range with the heat source system 46 (causing the communication link to fail). However, as a result of the second communication link between the heat source system 46 and the cooking device system 82, in some examples, the food item may still be cooked in the absence of the user and/or the wireless device 14. For example, as is discussed above, the cooking instructions 70 may include a particular duration of time (such as 10 minutes). In such an example, if the wireless device 14 moves out of communication range with the heat source system 46 before the 10 minutes has lapsed, the heat source system 46 may continue to provide the amount of energy to the cooking device 86 for the remainder of the 10 minutes. This may allow the heat source 50 to continue to cook the food item even in the absence of the user and/or the wireless device 14. As such, the wireless device 14 may not need to remain within communication range for the entire cooking process, which may free up the user and/or the wireless device 14 for extended periods of time. In such examples, the cooking system 10 may be tolerant of disconnections (or connection failures) between the wireless device 14 and the heat source system 46 and/or the cooking device system 82.

Furthermore, if the wireless device 14 returns to within communication range before the end of the duration of time, the cooking of the food item may continue on as if the user and/or wireless device 14 had never left. Alternatively, if the wireless device 14 does not return to within communication range before the end of the duration of time, the heat source system 46 may shut down or move to a hold temperature (such as a warming temperature) to prevent potential fire hazards and/or to prevent the food item from being overcooked.

As is discussed above, the cooking system 10 of FIGS. 1A-1B includes a wireless device 14. Wireless device 14 represents any suitable components that may communicate with a user so as to provide cooking information (such as cooking recipes) to the user, and that may further communicate with the heat source system 46 to assist the user in cooking. Additionally, the wireless device 14 may further communicate with the cooking device system 82 to further assist the user in cooking. Wireless device 14 may be a laptop, a mobile telephone or cellular telephone (such as a Smartphone), an electronic notebook, a tablet (such as an iPad), a personal digital assistant, a video projection device, any other device capable of receiving, processing, storing, and/or communicating information with other components of system 10, or any combination of the preceding. As is illustrated in FIGS. 1A-1B, the wireless device 14 is a tablet. Furthermore, as illustrated, wireless device 14 includes a network interface 18, a processor 22, and a memory unit 26.

Network interface 18 represents any suitable device operable to receive information from network 38 and/or network 42, transmit information through network 38 and/or network 42, perform processing of information, communicate to other devices, or any combination of the preceding. For example, network interface 18 receives measurement information 74 (such as a current temperature associated with the cooking of a food item) from the cooking device system 82. As another example, network interface 18 communicates cooking instructions 70 to the heat source system 82. Network interface 18 represents any port or connection, real or virtual, (including any suitable hardware and/or software, including protocol conversion and data processing capabilities, to communicate through a local area network (LAN), a metropolitan area network (MAN), a wide area network (WAN), or other communication system) that allows wireless device 14 to exchange information with network 38, network 42, heat source system 46, network 78, cooking device system 82, or other components of system 10.

Processor 22 communicatively couples to network interface 18 and memory unit 26, and controls the operation and administration of wireless device 14 by processing information received from network interface 18 and memory unit 26. Processor 22 includes any hardware and/or software that operates to control and process information. For example, processor 22 executes an electronic cookbook 30 to control the operation of wireless device 14, such as to cause the wireless device 14 to communicate with a user so as to provide cooking information (such as cooking recipes) to the user, and to further communicate with the heat source system 46 to assist the user in cooking. Processor 22 may be a programmable logic device, a microcontroller, a microprocessor, any suitable processing device, or any combination of the preceding.

Memory unit 26 stores, either permanently or temporarily, data, operational software, or other information for processor 22. Memory unit 26 includes any one or a combination of volatile or non-volatile local or remote devices suitable for storing information. For example, memory unit 26 may include random access memory (RAM), read only memory (ROM), magnetic storage devices, optical storage devices, any other suitable information storage device, or any combination of the preceding. While illustrated as including particular information modules, memory unit 26 may include any suitable information for use in the operation of wireless device 14.

As illustrated, memory unit 26 includes the electronic cookbook 30. Electronic cookbook 30 represents any suitable set of instructions, logic, or code embodied in a computer-readable storage medium and operable to facilitate the operation of wireless device 14 with regard to cooking and/or the electronic cookbook 30. Memory unit 26 may further include any other suitable set of instructions, logic, or code embodied in computer-readable storage medium and operable to facilitate other operations of wireless device 14, such as a telephone function of the wireless device 14, any other Smartphone or tablet function of the wireless device 14, any other function of the wireless device 14, or any combination of the preceding.

The electronic cookbook 30 may provide the user with instructions (and other content) associated with cooking. For example, the electronic cookbook 30 may provide the user with one or more cooking recipes and additional content that may assist the user in cooking a food item (such as a steak or chili). Additional information regarding an example of the electronic cookbook 30 is discussed below with regard to electronic cookbook 230.

Network 38 represents any suitable network operable to facilitate communication between the components of system 10, such as wireless device 14 and heat source system 46. Network 38 may include any interconnecting system capable of transmitting audio, video, signals, data, messages, or any combination of the preceding. Network 38 may include all or a portion of a public switched telephone network (PSTN), a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 38 may include a WPAN (which may include, for example, Bluetooth, Bluetooth low power, Bluetooth 5, ANT+, Zigbee (IEEE 802.15.4), other IEEE 802.15 protocols, IEEE 802.11 A, B or G without limitation, and Wi-Fi (IEEE 802.11)), a cellular communication network, an infrared communication network, any other wireless network operable to facilitate communication between the components, or any combination of the preceding.

Network 42 represents any suitable network operable to facilitate communication between the components of system 10, such as wireless device 14 and cooking device system 82. Network 42 may include any interconnecting system capable of transmitting audio, video, signals, data, messages, or any combination of the preceding. Network 42 may include all or a portion of a PSTN, a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 42 may include a WPAN (which may include, for example, Bluetooth, Bluetooth low power, Bluetooth 5, ANT+, Zigbee (IEEE 802.15.4), other IEEE 802.15 protocols, IEEE 802.11 A, B or G without limitation, and Wi-Fi (IEEE 802.11)), a cellular communication network, an infrared communication network, any other wireless network operable to facilitate communication between the components, or any combination of the preceding. Furthermore, network 42 may be the same type of network as network 38, or network 42 may be a different type of network than network 38. For example, both network 42 and network 38 may be a Bluetooth communication network. As another example, network 42 may be WiFi communication network, while network 38 may be a Bluetooth communication network. Additionally, although network 42 and network 38 are illustrated as separate networks, network 42 and network 38 may be the same network.

Heat source system 46 represents any suitable components that can provide an amount of energy to cook a food item, and that can further communicate with the wireless device 14 to assist the user in cooking. Additionally, the heat source system 46 may also communicate with the cooking device system 82 to assist the user in cooking.

As is illustrated, the heat source system 46 includes a heat source 50, a network interface 54, a processor 58, and a memory unit 62. The heat source 50 may be any device that may provide an amount of energy to cook a food item. For example, the heat source 50 may be a burner (such as an induction burner, gas burner, infrared burner, and/or heating coil), a resistive heating element, a heat lamp (such as a Halogen lamp), an oven, a microwave, a stove top, a range, a grill, any other device that may provide an amount of energy to cook a food item, or any combination of the preceding. As is illustrated, the heat source 50 is a gas burner that provides heat energy in the form of a gas flame. The heat source system 46 may include any number of heat sources 50.

The heat source 50 may further be connected to a power source that provide power (or energy) to the heat source 50, thereby allowing the heat source 50 to provide an amount of energy to cook a food item. The power source may be any type of power source, such as an electrical power source (e.g., a battery or a connection to an electrical outlet), a gas power source (e.g., a gas canister or a connection to a gas line), any other source of power (or energy), or any combination of the preceding.

As is discussed above, the heat source system 46 further includes network interface 54, processor 58, and memory unit 62. The network interface 54, processor 58, and memory unit 62 may be positioned at any location on, in, or adjacent the heat source system 46 so as to allow the interface 54 and processor 58 to communicate with the heat source(s) 50 of the heat source system 46 and/or communicate with the wireless device 14 and/or the cooking device system 82. In such an example, the processor 58 may be communicatively coupled (and potentially physically or electrically coupled) to the heat source(s) 50 and/or the wireless device 14 and/or the cooking device system 82.

Network interface 54 represents any suitable device operable to receive information from network 38 and/or network 78, transmit information through network 38 and/or network 78, receive information from heat source 50, transmit information to heat source 50, perform processing of information, communicate to other devices, or any combination of the preceding. For example, network interface 54 receives temperature information or other measurement information 74 associated with the cooking of a food item from the wireless device 14 (and the electronic cookbook 30). Network interface 54 represents any port or connection, real or virtual, (including any suitable hardware and/or software, including protocol conversion and data processing capabilities, to communicate through a LAN, MAN, WAN, or other communication system) that allows heat source system 46 to exchange information with wireless device 14, network 38, network 42, network 78, cooking device system 82, or other components of system 10.

Processor 58 communicatively couples to network interface 54 and memory unit 62, and controls the operation and administration of heat source system 46 by processing information received from network interface 54 and memory unit 62. Processor 58 includes any hardware and/or software that operates to control and process information. For example, processor 58 executes a heat source system management application 66 to control the operation of heat source system 46, such as to provide an amount of energy to cook a food item, and to communicate with the wireless device 14 to assist the user in cooking. Processor 58 may be a programmable logic device, a microcontroller, a microprocessor, any suitable processing device, or any combination of the preceding.

Memory unit 62 stores, either permanently or temporarily, data, operational software, or other information for processor 58. Memory unit 62 includes any one or a combination of volatile or non-volatile local or remote devices suitable for storing information. For example, memory unit 62 may include RAM, ROM, magnetic storage devices, optical storage devices, any other suitable information storage device, or any combination of the preceding. While illustrated as including particular information modules, memory unit 62 may include any suitable information for use in the operation of heat source system 46.

As illustrated, memory unit 62 includes heat source system management application 66, cooking instructions 70, and measurement information 74. Heat source system management application 66 represents any suitable set of instructions, logic, or code embodied in a computer-readable storage medium and operable to facilitate the operation of heat source system 46.

Cooking instructions 70 represent any set of instruction(s) that may be utilized by the heat source system 46 to assist the user in cooking. For example, the cooking instructions 70 may be a temperature that a food item is to be cooked at (such as 375° Fahrenheit), a period of time that a food item is to be cooked at a particular temperature (such as 45 minutes at 375° Fahrenheit), a food identifier that is to be added to food item (such as onions), any other information associated with cooking or a cooking recipe, or any combination of the preceding. The cooking instructions 70 may be received by the heat source system 46 from the wireless device 14.

Measurement information 74 represents any set of measurements associated with a food item in (or adjacent to) the cooking device system 82. For example, the measurement information 74 may be a current temperature associated with the food item (e.g., the current temperature the food item is being cooked at), a weight measurement associated with the food item, an acidity measurement associated with the food item, a measure of the degree to which chemical reactions associated with cooking (such as the Maillard reaction or denaturation of proteins) have occurred during cooking, any other measurement associated with the food item (or the cooking device system 82), or any combination of the preceding. The measurement information 74 may be received by the heat source system 46 from the cooking device system 82.

Network 78 represents any suitable network operable to facilitate communication between the components of system 10, such as heat source system 46 and cooking device system 82. Network 78 may include any interconnecting system capable of transmitting audio, video, signals, data, messages, or any combination of the preceding. Network 78 may include all or a portion of a PSTN, a public or private data network, a LAN, a MAN, a WAN, a WPAN, a local, regional, or global communication or computer network, such as the Internet, a wireline or wireless network, an enterprise intranet, or any other suitable communication link, including combinations thereof, operable to facilitate communication between the components. Preferable examples of network 78 may include a WPAN (which may include, for example, Bluetooth, Bluetooth low power, Bluetooth 5, ANT+, Zigbee (IEEE 802.15.4), other IEEE 802.15 protocols, IEEE 802.11 A, B or G without limitation, and Wi-Fi (IEEE 802.11)), a cellular communication network, an infrared communication network, any other wireless network operable to facilitate communication between the components, or any combination of the preceding. Furthermore, network 78 may be the same type of network as network 38 and/or network 42, or network 78 may be a different type of network than both network 38 and network 42. For example, each of network 38, network 42, and network 78 may be a Bluetooth communication network. As another example, network 78 may be a wired network, network 42 may be a WiFi communication network, and network 38 may be a Bluetooth communication network. Additionally, although network 78, network 42, and network 38 are illustrated as separate networks, network 78 may be the same network as network 38 and/or network 42.

Cooking device system 82 represents any suitable components that may be used for cooking a food item. The cooking device system 82 may also communicate with the heat source system 46 to assist the user in cooking. Additionally, the cooking device system 82 may further communicate with the wireless device 14 to assist the user in cooking.

As is illustrated, the heat source system 46 includes a cooking device 86, measurement sensors 90 (e.g., measurement sensors 90a-90d), a network interface 94, a processor 98, and a memory unit 102. The cooking device 86 may be any device that may be used in cooking a food item. For example, the cooking device 86 may be a food support platform that may support, hold, or enclose the food item while it is being cooked, such as a pot, a pan, a vessel, a tray, a grill platen, a grate, an oven, a pressure cooker, a rice cooker, a slow cooker, a microwave oven, a toaster oven, an oven, a teapot, any other device that may support, hold, or enclose a food item while it is being cooked, or any combination of the preceding. As another example, the cooking device 86 may be a cooking utensil, such as a spoon, tongs, a spatula, a measurement probe (such as a probe that measures temperature), any other utensil that may be used while cooking a food item, or any combination of the preceding. As is illustrated, the cooking device 86 is a cooking pan.

A measurement sensor 90 (e.g., measurement sensors 90a-90d) represents any sensor that may measure or sense (or otherwise provide) a measurement associated with a food item. For example, a measurement sensor 90 may be a temperature sensor that measures a temperature of the food item, a temperature adjacent the food item (such as a temperature of a portion of the cooking device 86 or a temperature of the environment inside or adjacent the cooking device 86), a temperature that the food item is being cooked at, any other temperature associated with cooking the food item, or any combination of the preceding. As another example, the measurement sensor 90 may measure volume, weight, moisture, acidity, alkalinity, color, pressure, liquid level, the denaturing of one or more proteins, any other attributes of the food item and/or the cooking device 86, or any combination of the preceding. As a further example, the measurement sensor 90 may be a chemical sensor, an accelerometer to measure a user's physical movement of the food item and/or the cooking device 86, motion sensors or other location sensors to determine if a user and/or the food item is at a particular location, any other type of sensor, or any combination of the preceding.

All of the measurement sensors 90 may measure or sense the same type of measurement (such as temperature), or one or more of the measurement sensors 90 may measure different types of measurements than the other measurement sensors (e.g., a first set of measurement sensors 90 may measure temperature and a second set of measurement sensors 90 may measure weight and/or liquid level). As is illustrated, the measurement sensors 90 are measurement sensors 90 that measure a temperature of various portions of the cooking device 86. The measurement sensor(s) 90 may be positioned at any location in, on, or adjacent the cooking device system 82 so as to allow the measurement sensor(s) 90 to measure information associated with the food item, and to further allow the measurement sensor(s) to transmit such information to the processor 98. The measurement sensor(s) 90 may be coupled to (or otherwise positioned at) any location in, on, or adjacent the cooking device system 82, and the measurement sensor(s) 90 may be coupled to (or otherwise positioned at) such a location in any manner. As an example, the measurement sensor(s) 90 may be bonded to the location (using an adhesive, for example), connected to the location using a rivet or a clip, positioned in-between two or more materials at the location (such as two or more layers of the material of the cooking device 86), formed integral with a device at the location (such as formed integral with all or a portion of the cooking device 86), coupled to the location in any other manner, or any combination of the preceding.

As is discussed above, the cooking device system 82 further includes network interface 94, a processor 98, and a memory unit 102. The network interface 94, processor 98, and memory unit 102 may be positioned at any location on, in, or adjacent the cooking device system 82 so as to allow the interface 94 and processor 98 to communicate with the measurement sensor(s) 90, and further communicate with the wireless device 14 and/or heat source system 46. In such an example, the processor 98 may be communicatively coupled (and potentially physically or electrically coupled) to the measurement sensor(s) 90 and/or the wireless device 14 and/or the heat source system 46. As is illustrated, the network interface 94, processor 98, and memory unit 102 are positioned in (or on) the handle of cooking device system 82. In some examples, the positioning of the network interface 94, processor 98, and memory unit 102 may protect these components from excessive heat.

Network interface 94 represents any suitable device operable to receive information from network 42 and/or network 78, transmit information through network 42 and/or network 78, receive information from measurement sensors 90, transmit information to measurement sensors 90, perform processing of information, communicate to other devices, or any combination of the preceding. For example, network interface 94 receives measurements from measurement sensors 90. As another example, network interface 94 transmits measurement information 74 to heat source system 46. Network interface 94 represents any port or connection, real or virtual, (including any suitable hardware and/or software, including protocol conversion and data processing capabilities, to communicate through a LAN, MAN, WAN, or other communication system) that allows cooking device system 82 to exchange information with wireless device 14, network 38, network 42, heat source system 46, network 78, or other components of system 10.

Processor 98 communicatively couples to network interface 94 and memory unit 102, and controls the operation and administration of cooking device system 82 by processing information received from network interface 94 and memory unit 102. Processor 98 includes any hardware and/or software that operates to control and process information. For example, processor 98 executes a cooking device system management application 106 to control the operation of cooking device system 82, such as to communicate with the heat source system 46 to assist the user in cooking, or to communicate with the wireless device 14 to assist the user in cooking. Processor 98 may be a programmable logic device, a microcontroller, a microprocessor, any suitable processing device, or any combination of the preceding.

Memory unit 102 stores, either permanently or temporarily, data, operational software, or other information for processor 98. Memory unit 102 includes any one or a combination of volatile or non-volatile local or remote devices suitable for storing information. For example, memory unit 102 may include RAM, ROM, magnetic storage devices, optical storage devices, any other suitable information storage device, or any combination of the preceding. While illustrated as including particular information modules, memory unit 102 may include any suitable information for use in the operation of cooking device system 82.

As illustrated, memory unit 102 includes cooking device system management application 106. Cooking device system management application 106 represents any suitable set of instructions, logic, or code embodied in a computer-readable storage medium and operable to facilitate the operation of cooking device system 82.

In an exemplary embodiment of operation of cooking system 10, a user may desire to cook a food item, such as steak or chili. To do so, the user may utilize their wireless device 14 (such as a mobile phone or tablet). In particular, the user may cause the wireless device 14 to execute the electronic cookbook 30. The user may cause the wireless device 14 to execute electronic cookbook 30 in any manner. For example, the electronic cookbook 30 may be an "app" installed on the wireless device 14. In such an example, the user may cause the wireless device 14 to execute the electronic cookbook 30 by selecting an icon for the electronic cookbook 30 displayed on the wireless device 14.

Once executed by the wireless device 14, the electronic cookbook 30 may display content associated with cooking. For example, the electronic cookbook 30 may include cooking recipes, such as recipes for how to cook steak, pasta, bakery items (such as cakes), appetizers, soups, salads, chicken, or any other food item. The electronic cookbook 30 may further include videos associated with cooking (such as cooking instructional videos), pictures associated with cooking (such as pictures of a food item after it has been cooked in accordance with the cooking recipe, pictures regarding how to prepare portions of a food item, etc.), any other information associated with cooking, or any combination of the preceding.

The user may navigate through the electronic cookbook 30 in order to select a particular cooking recipe to be used to cook a food item. The user may navigate through the electronic cookbook 30 in any manner. For example, the user may utilize a search function of the electronic cookbook 30 to search for a particular cooking recipe. As another example, the user may have stored favorite cooking recipes in a particular section of the electronic cookbook 30. In such an example, the user may navigate to that section (such as by clicking on the "favorites" tab in the electronic cookbook 30) in order to select a particular cooking recipe. As a further example, the electronic cookbook 30 may include suggested recipes and/or recipes that have been rated by other users or by celebrity chefs. As another example, the user may scroll through all (or a portion) of the cooking recipes to select a particular recipe.

Once a particular recipe (such as a recipe for chili, for example) has been selected, the electronic cookbook 30 may display on the wireless device 14 the cooking recipe associated with the selected food item. The electronic cookbook 30 may display the entire cooking recipe on the wireless device 14, or only a portion of the cooking recipe on the wireless device 14. The cooking recipe may include any information that may be utilized in cooking the food item, such as steps (or stages) for preparing the food item, a list of ingredients for the food item, a list of quantities of ingredients for the food item, a list of substitute ingredients for the food item, a list of devices or appliances that may be used to cook the food item (such as a description and/or picture of a particular pot/pan, a description and/or picture of a particular type of appliance (such as an oven or grill) that should be used to cook the food item, etc.), any other information associated with the food item, or any combination of the preceding. The cooking recipe may also include instructional videos associated with cooking the food item and/or pictures associated with ingredients of the food item (such as a picture of an onion, a picture of a diced onion, a picture of what an onion looks like after being caramelized, etc.).

The electronic cookbook 30 may further include a step-by-step guide for cooking the food item in accordance with the cooking recipe. This step-by-step guide may navigate the user through each step in the cooking process. For example, the cooking recipe for chili may include the following steps: (1) meat is added to the pot and browned at a particular temperature (such as 375° F.) for a particular duration of time (such as 10 minutes); (2) onions and or other ingredients are added to the browned meat; (3) this combination of ingredients is cooked at a second particular temperature (such as 300° F.) for a second particular duration of time (such as 5 minutes); (4) tomatoes, tomato sauce, and spices are added; (5) this combination of ingredients is cooked at a third particular temperature (such as 212° F.) for a third particular duration (till the tomato sauce combination is reduced by ½); and (6) the entire food item is cooked at a fourth temperature (such as 180° F.) for a fourth particular duration of time (such as 4 hours).

In the step-by-step guide, each of the above example steps for chili may be displayed individually (or individually highlighted in the cooking recipe to identify the current step). For a current step, the wireless device 14 may display information that explains the current step in the cooking recipe, and further explains what the user is supposed to do during that step. Once the step has been completed, the user may be prompted to indicate that the step has been completed, such as by clicking on a "next" button displayed on the wireless device 14. This may allow the user to navigate to the next step. The user may click on a button of the wireless device 14 or the screen of the wireless device 14 to activate such a "next" button. Additionally (or alternatively), the user may click on any other button (or control device) to navigate through the steps (or stages), as is discussed below.

The step-by-step guide may further include additional information associated with cooking the food item. For example, if the first step for cooking chili is to add meat to a cooking device 86 (such as a 5 quart pot), the first step in the step-by-step guide may include pictures of the recommended cooking device 86, pictures of the recommended heat source 50 (such as a burner) that should be used to cook the meat, nutritional information associated with the meat, information about the type of animal that the meat comes from, instructional videos on how to handle the meat, instructional videos and/or other information associated with sanitizing your hands after touching the meat, other information associated with the particular step, or any combination of the preceding.

Following the selection of a particular cooking recipe (such as chili), the wireless device 14 may prompt the user to select which heat source system 46 and which cooking device system 82 the user will use to cook the food item. The wireless device 14 may prompt the user to select the heat source system 46 and cooking device system 82 by displaying descriptions and/or pictures of various heat source systems 46 and cooking device systems 82 that may be proper for a particular recipe. For example, if the recipe recommends that the user use a burner to cook the chili, the wireless device 14 may prompt the user to select which burner on a grill or stovetop (such as the front left burner of the stovetop) they intend to use to cook the chili. As another example, if the recipe recommends that the user use either a 5 quart pot or a 10 quart pot to cook the chili, the wireless device 14 may prompt the user to select which of the 5 quart pot or a 10 quart pot they intend to use to cook the chili.

In order to display descriptions and/or pictures of heat source systems 46 and/or cooking device systems 82, the wireless device 14 (and electronic cookbook 30) may receive information about each heat source system 46 and/or cooking device system 82 that is available for use in a particular kitchen. The information may be received in any manner. For example, the heat source systems 46 and cooking device systems 82 may have been pre-registered with the wireless device 14 and the electronic cookbook 30 when the heat source systems 46 and/or cooking device systems 82 are purchased. Such pre-registration may allow the wireless device 14 to know that they are available (e.g., to know that they are available in that particular kitchen). As another example, the wireless device 14 may communicate with the heat source systems 46 and cooking device systems 82 to know that they are available. In such an example, the heat source systems 46 and cooking device systems 82 may broadcast advertisement packets (such as Bluetooth advertisement packets) that advertise the heat source systems 46 and cooking device systems 82. This may allow the wireless device 14 to know which heat source systems 46 and cooking device systems 82 are available in the kitchen. The wireless device 14 may also use the strength of broadcast signals from heat source systems 46 and cooking device systems 82 to determine which are nearby. Wireless device 14 may also use technology such as Near Field Communication (NFC) to determine which heat source systems 46 and cooking device systems 82 are nearby. In some examples, heat source system 46 may use any of the above techniques to discover which cooking device systems 82 are in its vicinity, and may further communicate that information to wireless device 14. In other examples, cooking device system 82 may use any of the above techniques to discover which heat source systems 46 are in its vicinity, and may further communicate that information to wireless device 14.

Instead of (or in addition to) prompting a user to select which heat source system 46 and cooking device system 82 will be used to cook the food item, the wireless device 14 may instruct the user to use a particular heat source system 46 and/or cooking device system 82. For example, the wireless device 14 may analyze the cooking recipe to determine what heat source system 46 and cooking device system 82 are acceptable for the recipe. Furthermore, the wireless device 14 may further determine what heat source systems 46 and cooking device systems 82 are available in a kitchen. Based on these determinations, the wireless device 14 may compare the results to determine the best fit for the particular recipe. Additionally, the wireless device 14 may show the user a description and/or picture of which heat source system 46 and/or cooking device system 82 to use.

The wireless device 14 may also send a signal to the heat source system 46 and/or cooking device system 82 to help the user locate the recommended heat source system 46 and/or cooking device system 82. This signal may cause the recommended heat source system 46 and/or cooking device system 82 to provide an indication (such as a visual indication and/or an audible indication) to the user. To provide the indication, the heat source system 46 and/or cooking device system 82 may include a lighting system that may light up (or blink), a speaker system that may emit the audible sound, any other indication system, or any combination of the preceding. The indication(s) may assist the user in determining which heat source system 46 and/or cooking device system 82 to use.

Following the selection of a particular heat source system 46, the wireless device 14 may establish a first communication link with the selected heat source system 46. The first communication link, for example, may be with the front left gas burner of a stovetop or may be a common or single communication link through which the communication link is shared among the various burners of a multi-burner stovetop. This communication link may be established over network 38, as is illustrated in FIG. 1B. The wireless device 14 may establish any type of communication link with the heat source system 46, and may establish the communication link in any manner. As an example, the wireless device 14 may establish a Bluetooth communication link, a Wi-Fi communication link, an infrared communication link, a cellular communication link, any other wireless communication link, or any combination of the preceding. Additionally, the wireless device 14 may establish the communication link in any manner. For example, the wireless device 14 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

As is illustrated in FIG. 1B, the wireless device 14 establishes a Bluetooth communication link with the heat source system 46. The communication link may be any type of Bluetooth communication link. For example, the communication link may be a 1:1 Bluetooth link, where the wireless device 14 operates as the central device, and the heat source system 46 operates as the auxiliary device.

Following the selection of a particular cooking device system 82, the heat source system 46 may establish a second communication link with the selected cooking device system 82. This second communication link may be established over network 78, as is illustrated in FIG. 1B. The heat source system 46 may establish any type of communication link with the cooking device system 82. As an example, the heat source system 46 may establish a Bluetooth communication link, a Wi-Fi communication link, an infrared communication link, a cellular communication link, any other wireless communication link, a wired communication link (such as when the cooking device system 82 is a cooking pan that is in a physical connection with a heat source system 46 that is a rice cooker or a slow cooker), or any combination of the preceding. Additionally, the heat source system 46 may establish the communication link in any manner. For example, the heat source system 46 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

The second communication link (in-between the heat source system 46 and the cooking device system 82) may be the same type of communication link as the first communication link (in-between the wireless device 14 and the heat source system 46). For example, both the second communication link and the first communication may be Bluetooth communication links. As another example, the second communication link and the first communication link may be different types of communication links. For example, the second communication link may be a wired communication link and the first communication link may be a Bluetooth communication link or a Wi-Fi communication link.

As illustrated in FIG. 1B, the second communication link between the heat source system 46 and the cooking device system 82 is a Bluetooth communication link. The second communication link may be any type of Bluetooth communication link, and the second communication link may be established in any way.

For example, the second communication link may be a communication link where the heat source system 46 receives Bluetooth advertisement packets from the cooking device system 82, and the heat source system 46 then uses the Bluetooth advertisement packets to request Bluetooth scan response packets (or other types of packets) from the cooking device system 82. The heat source system 82 may establish such a second communication link in any manner. For example, the heat source system 82 may establish this communication link based on information received from the wireless device 14. In such an example, the wireless device 14 may obtain the Bluetooth unique identifier for the cooking device system 82 from the Bluetooth advertisement packets broadcasted by the cooking device system 82. The wireless device 14 may then transmit this Bluetooth unique identifier for the cooking device system 82 to the heat source system 46. The heat source system 46 may use this Bluetooth unique identifier to filter out or ignore any other Bluetooth advertisement packets (or other advertisement packets), other than those broadcasted by the cooking device system 82. Additionally, when the heat source system 46 receives a Bluetooth advertisement packet from the cooking device system 82, the heat source system 46 may use an identifier in the Bluetooth advertisement packet to request Bluetooth scan response packets (or other types of packets) from the cooking device system 82.

In another example, the second communication link may be a communication link where the cooking device system 82 obtains the Bluetooth unique identifier of the heat source system 46, and then the cooking device system 82 may use this Bluetooth unique identifier to send packets (such as scan response packets) directly to the heat source system 46. In such an example, cooking device system 82 may obtain the Bluetooth unique identifier of the heat source system 46 from the wireless device 14. For example, the wireless device 14 may obtain the Bluetooth unique identifier for the heat source system 46 from the Bluetooth advertisement packets broadcasted by the heat source system 46 (or from the 1:1 Bluetooth connection with the heat source system 46), and then the wireless device 14 may transmit this Bluetooth unique identifier for the heat source system 46 to the cooking device system 82. The cooking device system 82 may then use this Bluetooth unique identifier to send packets (such as scan response packets) directly to the heat source system 46, for example.

Following the selection of a particular cooking device system 82, the wireless device 14 may also establish a third communication link with the selected cooking device system 82. This third communication link may be established over network 42, as is illustrated in FIG. 1B. The wireless device 14 may establish any type of communication link with the cooking device system 82. As an example, the wireless device 14 may establish a Bluetooth communication link, a Wi-Fi communication link, an infrared communication link, a cellular communication link, any other wireless communication link, or any combination of the preceding. Additionally, the wireless device 14 may establish the communication link in any manner. For example, the wireless device 14 may establish the communication link by sending a request for a communication link to another device, accepting another device's request for a communication link, responding to an advertisement or any other transmittal, sending an advertisement or any other transmittal, any other manner of establishing a communication link, or any combination of the preceding.

The third communication link (in-between the wireless device 14 and the cooking device system 82) may be the same type of communication link as the second communication link (in-between the heat source system 46 and the cooking device system 82) and the first communication link (in-between the wireless device 14 and the heat source system 46). For example, each of the third communication link, the second communication link, and the first communication link may be a Bluetooth communication link. As another example, the third communication link may be a different type of communication link than the second communication link and/or the first communication link. For example, the third communication link may be a Wi-Fi communication link, the second communication link may be a wired communication link, and the first communication link may be a Bluetooth communication link.

As is illustrated in FIG. 1B, the third communication link between the wireless device 14 and the cooking device system 82 is a Bluetooth communication link. The third communication link may be any type of Bluetooth communication link. For example, the third communication link may be a communication link where the wireless device 14 receives Bluetooth advertisement packets from the cooking device system 82, and the wireless device 14 uses the Bluetooth advertisement packets to request Bluetooth scan response packets (or other types of packets) from the cooking device system 82. This may allow the wireless device 14 to receive measurement information 74, and display such measurement information 74 to the user on the display of the wireless device 14. For example, the wireless device 14 may receive an indication of the current temperature associated with the food item, and may display a graphical representation of this current temperature associated with the food item (e.g., a graphical representation of 375° F.). In some examples, the use of Bluetooth scan request and scan response packets, or similar broadcast packets may obviate the need for the cooking device system 82 and the wireless device 14 to have a 1:1 communication link.

Following the establishment of the first communication link between the wireless device 14 and the heat source system 46, the wireless device 14 may transmit cooking instructions 70 to the heat source system 46. The cooking instructions 70 may include any information associated with cooking the food item. For example, the cooking instructions 70 may include temperatures that a food item is to be cooked at and/or durations of time that the food item is to be cooked at the particular temperatures. Additionally, the cooking instructions 70 may include ingredients that are to be added to food item, steps that are to be performed by a user to cook the food item, any other information associated with cooking the food item, or any combination of the preceding.

The cooking instructions 70 may include information for an entire recipe, or may include information for only a portion of the recipe. For example, the cooking instructions 70 may only include information for a particular step in a step-by-step guide for cooking a food item. In such an example, when a particular step is finished, additional cooking instructions 70 may be sent to the heat source system 46. These additional cooking instructions 70 may include information for the next step. As another example, the cooking instructions 70 may include information for two or more particular steps in a step-by-step guide for cooking a food. These cooking instructions 70 may also be supplemented with additional cooking instructions 70 (if needed) as the user progresses through the cooking recipe.

As is illustrated, the cooking instructions 70 include at least an indication of a temperature, and an indication of a duration of time, for at least one of the steps of the cooking recipe. The indication may be data (or other information) that may allow the heat source system 46 to determine the temperature and/or the duration of time. For example, the indication may be the temperature itself (e.g., 375° F.) and/or the duration of time itself (e.g., 10 minutes), or it may be a signal or pointer (or any other type of data) that may be used by the heat source system 46 to determine the temperature and/or the duration of time. In the example discussed above with regard to a cooking recipe for chili, the cooking instructions 70 may include information associated with the first step of the cooking recipe (which provides for browning the meat at 375° F. for a duration of 10 minutes). As such, the cooking instructions 70 may include an indication of a temperature (e.g., 375° F.) and an indication of a duration of time (e.g., 10 minutes) for the first step.

Although the cooking instructions 70 have been described above as being received from the wireless device 14 through the first communication link, in some examples, the wireless device 14 may utilize an intermediary device to provide the cooking instructions 70. For example, if the first communication link (in-between the wireless device 14 and the heat source system 46) fails (or if a back-up set of the information is desired), the wireless device 14 may send the cooking instructions 70 to the heat source system 46 through the intermediary device (such as another wireless device 14, or the cooking device system 82).

Based on receiving the cooking instructions 70 (which may include an indication of a 375° F. temperature and an indication of a 10 minute duration of time), the heat source system 46 (via the processor 58, for example) may activate the heat source 50, so as to begin providing energy to the cooking device 86 of the cooking device system 82. Alternatively, if the heat source 50 is already activated, the heat source system 46 (via the processor 58, for example) may adjust the amount of energy being provided by the heat source 50 to the cooking device 86.

The amount of energy provided by the heat source 50 may also be based on the type of cooking device system 82 that is being used to cook the food item. For example, the heat source system 46 may store (or access) a profile associated with the particular cooking device system 82. Such a profile may include a type of cooking device 86 (e.g., a pot), of volume of the cooking device 86 (e.g., 5 quarts), a material type of the cooking device 86 (e.g., copper bottom), any other information associated with the cooking device 86 of the cooking device system 82, or any combination of the preceding. Using this profile, the heat source system 46 may adjust the amount of energy provided to the cooking device 86 by the heat source 50. For example, if the cooking device 86 is made of a material that heats to a higher temperature with a lower amount of energy, the heat source system 46 (via the processor 58, for example) may adjust the amount of energy provided to the cooking device 86 in accordance with such a profile.

While the heat source 50 is providing energy to the cooking device 86 in accordance with the cooking instructions 70, the heat source system 46 may receive information from the cooking device system 82 that may assist the heat source system 46 in cooking the food item. As is discussed above, the cooking device system 82 may include measurement sensors 90 that may measure or sense (or otherwise provide) a measurement associated with the food item. For example, the measurement sensors 90 may measure a current temperature associated with the food item (such as a current temperature of a food item, a current temperature of a portion of the cooking device 86 adjacent the food item, or a current temperature that the food item is being cooked at). Based on the measurements from the measurement sensors 90, the cooking device system 82 may transmit measurement information 74 to the heat source system 46 using the second communication link.

The measurement information 74 may include any information that may be measured using the measurement sensors 90. For example the measurement information 74 may include an indication of the current temperature that the food item is being cooked at. This indication may be data (or other information) that may allow the heat source system 46 to determine the current temperature that the food item is being cooked at. For example, the indication may be the current temperature itself (e.g., 375° F.) or may be a signal or pointer (or any other type of data) that may be used by the heat source system 46 to determine that the current temperature is 375° F. Additionally (or alternatively), the measurement information may include an indication of the current liquid level of the food item, an indication of the current weight of the food item, an indication of the current acidity of the food item, any other measurable information associated with cooking the food item, or any combination of the preceding.

The heat source system 46 may use the measurement information 74 to check (continuously or periodically) the amount of energy being applied to the cooking device 86. For example, if the heat source 50 is providing an amount of energy that is intended to cook the food item at 375° F., but the measurement information 74 indicates that the food is being cooked at a temperature of 350° F., the heat source system 46 may increase the amount of energy being applied to the cooking device 86. As another example, if the heat source 50 is providing an amount of energy that is intended to cook the food item at 375° F., but the measurement information 74 indicates that the food is being cooked at a temperature of 400° F., the heat source system 46 may decrease the amount of energy being applied to the cooking device 86. As a further example, if the heat source system 46 is providing an amount of energy that is intended to cook the food item at 375° F., and the measurement information indicates that the food is being cooked at a temperature of 375° F., the heat source system 46 may allow the heat source 50 to continue to provide the same amount of energy to the cooking device 86. As a further example, if the measurement information 74 indicates that the current cooking temperature is below the intended temperature of 375° F. but rising rapidly in a such a manner that it is likely to overshoot the intended temperature, the heat source system 46 may decrease the amount of energy provided by the heat source 50. As a further example, the heat source system 46 may make any of a variety of adjustments to the amount of energy provided by the heat source 50 based on the operation of a feedback or feedforward algorithm (for example a PID algorithm) on a series of temperature measurements 74.

The heat source system 46 may further use the measurement information 74 to check (continuously or periodically) for potential errors in the cooking process. For example, a user may have positioned the wrong cooking device system 82 on the heat source 50. In such an example, the heat source system 46 may utilize the measurement information 74 and a profile of the correct cooking device system 82 to determine that the wrong cooking device system 82 is currently positioned on the heat source 50. In particular, the profile for the correct cooking device system 82 may indicate that a particular amount of energy (such as a medium-high level) applied to the correct cooking device 86 should cause the food item to be cooked at a particular temperature (such as 375° F.). However, if the wrong cooking device system 82 is positioned on the heat source 50, the measurement information 74 received from the correct cooking device system 82 may indicate that the current temperature is too low for the amount of energy being provided by the heat source 50. Based on this, the heat source system 46 may determine that the wrong cooking device system 82 is positioned on the heat source 50. The heat source system 46 may then send an error signal to the wireless device 14, which may alert the user to the error. Such an error correction system may be particularly advantageous when multiple heat sources 50 are being used to apply energy to multiple cooking devices 86 so as to cook multiple different types of food items at similar (or identical) time periods. A heat source 50 could also determine which cooking device system 82 is positioned on top of or in it for cooking purposes by analyzing the strength of any wireless signals coming from the various cooking device systems 82 in vicinity of the heat source 50.

As further examples, the heat source system 46 may be able to use the measurement information 74 to determine that the wrong ingredients have been added to the cooking device system 82 (such as if the acidity of the food item is incorrect), that too much (or too little) of a particular ingredient has been added to the cooking device system 82 (such as if the amount of weight in the cooking device 86 is too high (or too low)), that the cooking device 86 is too full (or too empty), that the food item is boiling (or any other phase change is occurring), that the food item is about to boil over, that the food item has completely boiled away, that the acidity of the food item is incorrect, that the food item is heating improperly, that the food item has reached the desired texture (such as crispy) or doneness, that the lid of the cooking device 86 has been left off of the cooking device 86 (or left on the cooking device 86), any other information associated with an error in the cooking process, or any combination of the preceding.

As is discussed above, the cooking device system 82 may provide measurement information 74 to the heat source system 46. The cooking device system 82 may provide the measurement information 74 in any manner. For example, the cooking device system 82 may transmit the measurement information 74 using a Bluetooth communication link. To do so, the cooking device system 82 may periodically transmit Bluetooth advertisement packets that may identify the cooking device system 82. When the heat source system 46 receives such a Bluetooth advertisement packet, the heat source system 46 may request additional information from the cooking device system 82. In response to this request, the cooking device system 82 may activate one or more of the measurement sensors 90 so as to begin receiving measurements from the measurement sensors 90. Based on these measurements, the cooking device system 82 may create measurement information 74, and insert this measurement information 74 into a Bluetooth scan response packet (or any other type of Bluetooth packet). The measurement information 74 may be added into any suitable field in the Bluetooth scan response packet, such as a special field reserved for manufacturer-specific advertising data. The Bluetooth scan response packet may then be broadcast (or otherwise sent) to the heat source system 46 that requested the additional information. In some examples, each time a Bluetooth scan response packet is constructed, the most current measurement information 74 may be embedded in the Bluetooth scan response packet.

Typically, a Bluetooth scan response packet is a packet used by a peripheral device to provide more information than fits in a Bluetooth advertisement packet. This additional information may tell a device examining the advertisement and scan response packets about the services the peripheral provides, the name of the peripheral, and related information the receiver of the advertisement packet might want to know to determine whether it wants to connect with the peripheral. Unlike traditional Bluetooth scan response packets (whose content is always the same), the Bluetooth scan response packets created by the cooking device system 82 may have content that changes in-between successive Bluetooth scan response packets, as each Bluetooth scan response packet may include the most current measurement information 74 (which can change over time). Additional information regarding advertisement packets and/or scan response packets (or scanning packets) is discussed in the following documents, all of which are incorporated herein by reference: U.S. Patent Application Publication No. 2013/0003630 entitled "Connection Setup for Low Energy Wireless Networks Based on Scan Window and Scan Interval Estimation"; U.S. Patent Application Publication No. 2014/0321321 entitled "Method and Technical Equipment for Short Range Data Transmission"; U.S. Patent Application Publication No. 2015/0172391 entitled "Method, Apparatus, and Computer Program Product for Network Discovery"; U.S. Patent Application Publication No. 2015/0172902 entitled "Method, Apparatus, and Computer Program Product for Service Discovery in Wireless Short-Range Communication"; U.S. Patent Application Publication No. 2016/0029149 entitled "Low Power Consumption Short Range Wireless Communication System"; U.S. Pat. No. 6,795,421 entitled "Short-Range RF Access Point Design Enabling Services to Master and Slave Mobile Devices"; U.S. Pat. No. 7,602,754 entitled "Short-Range RF Access Point Design Enabling Services to Master and Slave Mobile Devices"; U.S. Pat. No. 8,588,688 entitled "Non-Networked Messaging"; U.S. Pat. No. 8,737,917 entitled "Method and System for a Dual-Mode Bluetooth Low Energy Device"; U.S. Pat. No. 8,817,717 entitled "Concurrent Background Spectral Scanning for Bluetooth Packets While Receiving WLAN Packets"; U.S. Pat. No. 9,185,652 entitled "Bluetooth Low Energy Module Systems and Methods"; U.S. Pat. No. 9,258,695 entitled "Method, Apparatus, and Computer Program Product for Service Discovery in Short-Range Communication Environment"; U.S. Pat. No. 9,357,342 entitled "Short-Range Wireless Controller Filtering and Reporting"; U.S. Pat. No. 9,414,217 entitled "Method and Technical Equipment for Short Range Data Transmission"; U.S. Pat. No. 9,456,295 entitled "Method and Apparatus for Receiving Content Based on Status of Terminal"; U.S. Pat. No. 9,538,356 entitled "Method and Apparatus for Bluetooth-Based General Service Discovery"; and U.S. Pat. No. 9,544,755 entitled "Method, Apparatus, and Computer Program Product for Non-Scannable Device Discovery".

In some examples, these steps may allow the cooking device system 82 to conserve its power source (such as a battery), allowing the power source to last longer. For example, by utilizing Bluetooth scan response packets to transmit information, in some examples, the cooking device system 82 may be able to transmit current measurement information 74 (e.g., current temperature data) without the computational and battery-life-limiting overhead associated with establishing and maintaining a formal Bluetooth connection. As another example, the cooking device system 82 may only utilize its measurement sensors 90 when additional information is requested. This may allow the measurement sensors 90 to remain dormant for long periods of time (such as when the cooking device system 82 is not being used at all), and reduce the amount of energy being used by the cooking device system 82. In other examples, the cooking device system 82 may constantly be using its measurement sensors 90 or using its measurement sensors 90 during a period when the user turns on the cooking device system 82 (such as by pressing a power button). In such examples, the cooking device system 82 may transmit measurement information 74 any time the measurement sensors 90 are activated, or only when the measurement information 74 is requested.

Although the steps discussed above have been described in relation to a Bluetooth communication link, such steps (or similar steps) may be performed for any other communication link, such as any other WPAN communication link (e.g., Bluetooth low power, Bluetooth 5, ANT+, Zigbee (IEEE 802.15.4), other IEEE 802.15 protocols, IEEE 802.11 A, B or G without limitation, or Wi-Fi (IEEE 802.11)), a cellular communication link, an infrared communication link, any other wireless communication link, any other communication link, or any combination of the preceding. Additionally, although the measurement information 74 has been described above as being sent to the heat source system 46 (using the second communication link), the measurement information 74 may also be sent to the wireless device 14 (using the third communication link). In such examples, the wireless device 14 may request the additional information after also receiving an advertisement packet (as is discussed above). By receiving the measurement information 74, the wireless device 14 may be able to display the information included in the measurement information 74 (such as the current temperature associated with the food item) to the user. The wireless device 14 may also be able to provide this information to the heat source system 46 if the second communication link (in-between the heat source system 46 and the cooking device system 82) fails (or if a back-up set of the information is desired), and/or the heat source system 46 may be able to provide this information to the wireless device 14 if the third communication link (in-between the wireless device 14 and the cooking device system 82) fails (or if a back-up set of the information is desired).

While the heat source 50 is providing energy to the cooking device 86 in accordance with the cooking instructions 70, the heat source system 46 may further keep track of the amount of time that the energy has been provided to the cooking device 86. This may allow the heat source system 46 to cook the food item at a particular temperature for a particular amount of time. For example, as is discussed above, the cooking instructions 70 may indicate that the food item is to be cooked at 375° for 10 minutes. In such an example, the heat source system 46 may keep track of the amount of time that it has been providing energy to the cooking device 86 for that particular step. When the duration of time has elapsed (or when the duration of time is close to lapsing, such as five minutes before lapsing, two minutes before lapsing, and/or one minute before lapsing), the heat source system 46 may send a signal to the wireless device 14 indicating that the duration of time has lapsed (or that the duration of time is close to lapsing). This may cause the wireless device 14 to alert the user, such as by making an audible sound, vibrating, texting the user, calling the user, or any other manner of alerting the user. The alert may inform the user that it is time to move to the next step (or that it is almost time to move to the next step).

Additionally (or alternatively), the wireless device 14 may also keep track of the time that has elapsed for that particular step. As such, the wireless device 14 may be able to alert the user of the time even without receiving a signal from the heat source system 46. Furthermore, the wireless device 14 may also provide a continuous countdown (or periodic updates) of the time left in the duration of time (such as 2 minutes and 30 seconds left till the next step).

When a step of the cooking recipe has been completed (such as when the first step of browning meat at 375° F. for 10 minutes, has been completed), the wireless device 14 may move to the next step. This movement to the next step (such as step two of the cooking recipe) may cause the wireless device 14 to display the next step to the user. Alternatively, if more than one step is already being displayed by the wireless device, such movement to the next step may cause the next step to be highlighted in some manner on the display to indicate that the next step is now the current step. The movement to the next step may also cause the wireless device 14 to transmit new cooking instructions 70 to the heat source system 46. The new cooking instructions 70 may include information associated with the new step. Alternatively, if the heat source system 46 already has access to all (or more than one set) of the cooking instructions 70 for the cooking recipe, the wireless device 14 may send an instruction to the heat source system 46 to move to the next step in the cooking instructions 70.

As is discussed above with regard to the chili example, the next step (e.g., step 2) may include the user adding onions and other ingredients. In such an example, the new cooking instructions 70 may include information that indicates that the heat source system 46 should continue to provide the same cooking temperature (e.g., 375° F.) for a duration of time (e.g., 5 minutes) to allow the user time to add the onions and other ingredients.

When this next step has been completed by the user, the user may indicate to the wireless device 14 that the step has been completed, such as by clicking the "next" button in the electronic cookbook 30. Additionally (or alternatively), the heat source system 46 may attempt to determine when the step has been completed. For example, the heat source system 82 may have stored information that indicates that the addition of ingredients to the food item should cause a sudden change in the current temperature associated with the food item. In such an example, after the ingredients have been added, the heat source system 46 may receive measurement information 74 that indicates that the current temperature associated with the food item has suddenly changed in a manner that is consistent with the addition of the ingredients. Based on this, the heat source system 46 may transmit a signal to the wireless device 14, indicating that the step has been completed. This may prevent the user from having to manually indicate that the step has been completed.

Alternatively, if the user has incorrectly indicated that the step has been completed, the heat source system 46 may be able to determine that this indication is incorrect. For example, if the heat source system 46 does not receive measurement information 74 that indicates, for example, a sudden change in the current temperature that the food item is being cooked at consistent with the addition of ingredients, the heat source system 46 may be able to determine that the ingredients have not been added. As such, the heat source system 46 may transmit an error message to the wireless device 14, which may cause the wireless device 14 to alert the user to the error.

Following the completion of the step (such as the completion of step 2, where onions and other ingredients were added to the food item), the wireless device 14 may move to the next step. Similar to the previous steps, such movement may cause the next step to be displayed to the user, and may further cause new cooking instructions 70 to be transmitted to the heat source system 46. As is discussed above with regard to the chili example, the next step (e.g., step 3) may include cooking the combination of ingredients at 300° F. for a duration of 5 minutes. In such an example, the new cooking instructions 70 may include the particular temperature (e.g., 300° F.) and the particular duration of time (e.g., 5 minutes).

In such an example, the heat source system 46 may reduce the amount of energy provided to the cooking device 86 in accordance with the cooking instructions 70, thereby causing the food item to be cooked at the lower temperature of 300° F. Similar to the steps discussed above, the heat source system 46 may continue to receive measurement information 74 from the cooking device system 82, thereby allowing the heat source system 46 to check the amount of energy being provided to the cooking device 86. Additionally, the heat source system 46 may also keep track of the amount of time that has elapsed in the current step.

The activities performed by the components of the cooking system 10 (discussed above) may continue for each of the steps of the cooking recipe. Once all of the steps of the cooking recipe have been completed (e.g., when the user indicates in the electronic cookbook 30 that all steps have been completed), the wireless device 14 may transmit final cooking instructions 70 to the heat source system 46. The final cooking instructions 70 may include instructions to the heat source system 46 to shut down all energy being provided to the cooking device 86. Therefore, when all steps of the cooking recipe have been completed, the wireless device 14 may cause the heat source system 46 to automatically shut down the heat source 50, which may prevent the user from having to manually shut off the heat source 50 (or to remember to shut off the heat source 50).

In addition to the steps described above, in some examples, the cooking system 10 may encounter obstacles when proceeding through the cooking recipe. As one example, the user may move away from the food item being cooked, such as to another room. In doing so, the user may take the wireless device 14 (such as their mobile phone or their tablet) with them. For example, the user may take the wireless device 14 to another room to make a call, to show a family member a video or picture stored on the wireless device 14, to browse the Internet, or to perform any other action with the wireless device 14 (including no action at all, such as when the user just carries the wireless device 14 with them), or any combination of the preceding. This may cause the wireless device 14 to move outside of communication range with the heat source system 46 and/or cooking device system 82, which may cause the first and/or third communication links to fail (at least temporarily).

Such movement away from the food item being cooked may traditionally be problematic. In particular, the user could forget that the food item is being cooked, which could be a fire hazard. Furthermore, it may be disadvantageous for a heat source to turn off every time the user moves away from communication range because the user may only be leaving the food item alone for a small period of time (such as a few seconds or minutes). Also, many food items may be cooked at low heat for long periods of time. If the heat source were to turn off when the user moves away from communication range, the user would be forced to stay within communication range during the entire cooking process (which could be 3-4 hours). Contrary to this, however, the cooking system 10 may utilize the second communication link between the heat source system 46 and the cooking device system 82, as is discussed above This second communication link may allow food to continue to be cooked in accordance with the cooking recipe, even if the user and/or wireless device 14 moves out of communication range of the heat source system 46.

As is discussed above, the heat source system 46 may receive cooking instructions 70 from the wireless device 14. These cooking instructions 70 may include a particular cooking temperature and a particular duration of time (such as 375° F. for 10 minutes). Using these cooking instructions 70, the heat source system 46 may provide energy intended to cook the food item at 375° F. for 10 minutes. Additionally, the heat source system 46 may receive measurement information 74 from the cooking device system 82, which may allow the heat source system 46 to check (continuously or periodically) the amount of energy being provided to the cooking device 86 and/or check for errors in the cooking process If (or when) the wireless device 14 moves outside of communication range with the heat source system 46 and/or cooking device system 82 (such as if the user carries the wireless device 14 to another room to make a phone call or to browse the internet using the wireless device 14), the heat source system 46 may still be able to communicate with the cooking device system 82 using the second communication link. As such, the heat source system 46 may still receive measurement information 74 from the cooking device system 82, thereby allowing the heat source system 46 to continue to check the amount of energy being provided to the cooking device 86 and/or to check for errors in the cooking process. Thus, cooking may continue to proceed in accordance with the cooking instructions 70.

Such operation by the heat source system 46 may continue for any amount of time after the wireless device 14 has moved outside of communication range. In one example, such operation by the heat source system 46 may continue until the duration of time has lapsed. For example, if the cooking instructions 70 indicated that the food item was to be cooked at 375° F. for 10 minutes, the heat source system 46 may continue to cook the food item at 375° F. for the duration of 10 minutes.

If the wireless device 14 were to return to within communication range before the end of the 10 minutes, no change in the cooking process may have occurred because the heat source 50 may have continued to cook the food item at 375° F. in accordance with the cooking instructions 70 (and with the help of the second communication link). Furthermore, no change in the cooking process may occur as long as the user performs the next step.

Alternatively, if the duration of 10 minutes were to lapse before the wireless device 14 was able to move back inside of communication range (such as if the phone call were to run long), the heat source system 46 may determine a next step using the cooking instructions 70. For example, the cooking instructions 70 may include a hold temperature (such as for example 150° F.) and a hold duration (such as, for example, 30 minutes) that may cause the heat source 50 to keep the food item warming (or cooking) at the hold temperature for the hold duration. This may allow the user additional time to bring the wireless device 14 back into communication range without completely ruining (or stopping) the cooking process. If the wireless device 14 does not move back into communication range before the hold duration lapses, the heat source system 46 may shut down the heat source 50, or move to a secondary hold temperature for a secondary duration of time.

As another example, the cooking instructions 70 may include a jump ahead step. As one example of this with regard to a cooking recipe for roasting a chicken, if the steps of the cooking recipe for the roasted chicken are almost all complete (such as if the only step that has not been complete is a minor step of adding a few spices to the chicken before a long roasting period), the jump ahead step may cause the cooking recipe to skip to the last step (or to the next major cooking step), where for example, the chicken is roasted at 375° F. for two hours. This jump ahead step may allow the chicken to be fully roasted (but without a few minor additional ingredients). As such, the entire recipe may not be ruined by the wireless device 14 moving outside of communication range and not returning until after the duration of time has elapsed.

Additionally, if it is determined that the wireless device 14 has moved outside of communication range, the wireless device 14 may attempt to notify a user of this problem. For example, the wireless device 14 may sound an audible alarm, vibrate, change the display screen of the wireless device 14 (such as change the color of the screen to red), text the user, call the user, or provide any other alert to the user. It may also attempt to alert them via an alternative communication mechanism that will be delivered to another device such as a computer or a smart TV. The wireless device 14 may also attempt to automatically fix the communication problem by attempting to establish a different communication link with the heat source system 46 and/or cooking device system 82. For example, if the wireless device 14 is using a Bluetooth communication link when the wireless device 14 moves outside of communication range, the wireless device 14 may attempt to establish a Wi-Fi communication link (or an infrared communication link, or a cellular communication link, or any other wireless communication link) with the heat source system 46 and/or cooking device system 82. In such an example, the wireless device 14 may cycle (or scan) through all of (or a portion of) its communication protocols in order to reestablish a communication link. Alternatively (or additionally), the heat source system 46 and/or cooking device system 82 may attempt to re-establish a failed communication link by cycling (or scanning) through all of (or a portion of) their communication protocols in order to reestablish a respective communication link.

Also, the wireless device 14 may also attempt to establish a communication link with an intermediary device that may communicate with the heat source system 46 and/or the cooking device system 82. For example, although the wireless device 14 is out of communication range with the heat source system 46 and/or cooking device system 82, the wireless device 14 may be within communication range (such as Bluetooth communication range) of an intermediary device (such as another mobile phone or another tablet) that is in a communication range (such as Bluetooth communication range) with the heat source system 46 and/or the cooking device system 82. In such an example, the wireless device 14 may use the intermediary device to extend its communication range. Alternatively (or additionally), the heat source system 46 and/or cooking device system 82 may attempt to establish a communication link with an intermediary device that may communicate with the wireless device 14.

Figure 2:
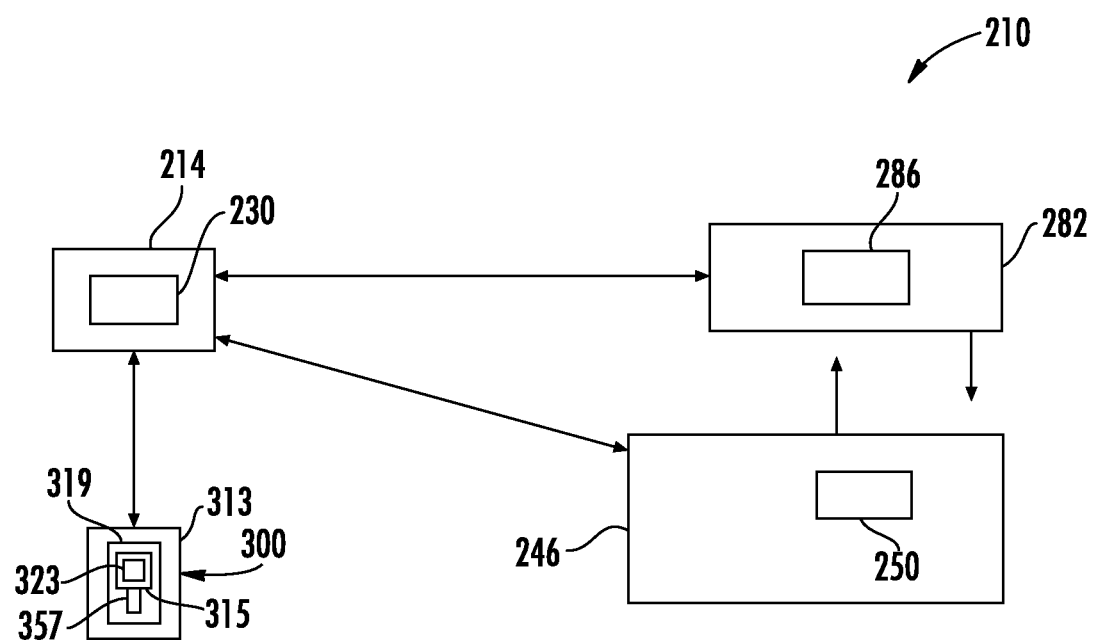
FIG. 2 is a schematic illustration of a communication scheme of a cooking system according to various embodiments.

FIG. 2 is a schematic illustration of a communication scheme of a cooking system 210 according to one embodiment. The cooking system 210 includes a computing device 214 comprising an electronic cookbook 230, a heat source system 246 including one or more heat sources 250, a cooking device system 282 including one or more cooking devices 286, and an auxiliary button system 300 including one or more auxiliary button interfaces 319. The electronic cookbook 230 may be in signal communication with a heat source system 246, the heat source system 246 may be in signal communication with a cooking device system 282, and/or the cooking device system 282 may be in signal communication with the electronic cookbook 230. Examples of these signal communication and communication schemes are discussed above with regard to FIGS. 1A and 1B.

The auxiliary button system 300 may be in signal communication with the electronic cookbook 230. Also, the electronic cookbook 230 may be in signal communication with the auxiliary button system 300 to, for example, provide notifications using a notification device 357, as described below. In some embodiments, this may include signal communication using the cooking device system 282 or heat source system 246 as an intermediary. In one such embodiment, the auxiliary button system 300 may be integrated with the heat source system 246, (e.g., with a heating device 250 or appliance), or with the cooking device system 282 (e.g., with a cooking device 286).

The computing device 214 may include a personal computer, a workstation, a laptop, a mobile telephone (such as a smartphone, or other wireless, cellular, cordless, or satellite telephone), an electronic notebook or tablet (e.g., an iPad™), a personal digital assistant, a data entry kiosk, a scanner, a small projection display, a conveniently located display built into an appliance (e.g., a front panel display on a refrigerator), a virtual reality or augmented reality display device, or any other computing device having appropriate communication circuitry hardware operable for wireless, wireline, or other suitable communication to perform the signal communication operations of the electronic cookbook 230. For example, the computing device 214 may comprise a processor and memory storing instructions that when executed by the processor cause the computing device 214 to perform the operations of the electronic cookbook 230. In various embodiments, the computing device 214 and electronic cookbook 230 may be similar to wireless device 14 and electronic cookbook 30, as described above with respect to FIGS. 1A and 1B, and may therefore include hardware (such as processor 22, network interface 18, and memory unit 26) and associated functionalities. For example, the electronic cookbook 230 may be operable to control a heat source system 246 for heating a cooking device system 282. As used herein, the electronic cookbook 230 may refer to the electronic cookbook 230 by itself, or to a device (such as computing device 214) that is performing the operations of the electronic cookbook 230.

As introduced above, the electronic cookbook 230 (or the computing device 214 performing the operations of the electronic cookbook 230) further comprises communication hardware suitable to transmit signals, such as control signals, to one or more heat source systems 246, each comprising one or more heat sources 250. Heat sources 250 may be configured to apply heat (or other energy) to a cooking device system 282, which may include one or more cooking devices 286. For example, the heat source system 246 may include a stove top, range, or grill comprising one or more heat sources 250 (such as a gas burner, induction burner, electric burner, heating coil, or any of the other heat sources described above with respect to FIGS. 1A and 1B). The cooking device system 282, for example, may comprise a cooking device 286 (such as a pot, pan, cooking vessel, tray, grate, any other device configured to hold foodstuff to be cooked by a heat source 250, or any of the cooking devices described above with respect to FIGS. 1A and 1B).

Heat source system 246 comprises suitable hardware to execute the operations of the heat source system 246 described herein (e.g., communication, measuring, sensing, power modulation, etc.). In various embodiments, the heat source system 246 may be similar to heat source system 46, as described above with respect to FIGS. 1A and 1B. For example, the heat source system 246 may represent any suitable components that can provide an amount of energy to cook a food item. As another example, the heat source system 246 may comprise network interface 54, processor 58, and memory unit 62, and may include similar functionalities to those described above with respect to the heat source system 46.

The cooking device system 282 comprises suitable hardware to execute the operations of the cooking device system 282 described herein (e.g., communication, measuring, sensing, etc.). In various embodiments, the cooking device system 282 may be similar to cooking device system 82, as described above with respect to FIGS. 1A and 1B. For example, the cooking device system 82 may represent any suitable components that may be used for cooking a food item. As another example, the cooking device system 282 may comprise network interface 94, processor 98, and memory unit 102, and may include similar functionalities to those described above with respect to the cooking device system 82.

In the example provided in FIG. 2, the electronic cookbook 230 and heat source system 246 are in 1:1 signal communication (e.g., via Bluetooth technology). The signal communication is two-way such that both the electronic cookbook 230 and heat source system 246 may send and receive signals. The signal communication may be similar to that described above with respect to communication between wireless device 14/electronic cookbook 30 and heat source system 46. For example, the signal communication may include communication through a network, such as network 38. As is also illustrated, the cooking device system 282 may also be in signal communication with the electronic cookbook 230 and/or the heat source system 246. For example, the cooking device system 282 is configured to advertise device information or environmental information (such as device ID and temperature) via a transmitter (which may include network interface 94) over a network (which may include network 38 or network 42) as described above. The cooking device system 282 may also include a receiver (which may include network interface 94) operable to receive prompts or requests to define advertising content. As described above, the electronic cookbook 230, heat source system 246, and cooking device system 282 may be configured for other communication schemes. For example, the electronic cookbook 230 and cooking device system 282 may be configured for 1:1 communication. In such an embodiment, the cooking device system 282 may or may not broadcast advertising signals or receive requests for advertising content. It will be appreciated that the auxiliary button system 300 may be similarly suitable for operation within such communication schemes.

In various embodiments, the electronic cookbook 230 (or the computing device 214 performing the operations of the electronic cookbook 230) may include a built-in planar display that may be protected by a separate window, cover, or cookbook holder. In some embodiments, the display may be displayed on a remote surface using the electronic cookbook 230 or a separate display device that receives display data from the electronic cookbook 230 (such as a projected display, a heads up display, virtual reality goggles, or a planar display associated with a different device (e.g., a cooking appliance or a separate display device)).

The electronic cookbook 230 may further include a user interface (such as a graphical user interface) in signal communication with a display. The computing device 214 may include the display, or the display may be a remote display. In some embodiments, the electronic cookbook 230 or auxiliary button system 300 may be configured to provide an additional or separate display to provide the user cooking instructions associated with one or more recipes.

As introduced above, the electronic cookbook 230 is configured to provide the user with cooking instructions associated with one or more recipes, and is further configured to communicate with the heat source system 246 to execute one or more stages of bringing the cooking device system 282 to a desired temperature (as specified by the recipe) and for a time specified by the recipe. Time control, temperature control, or control of both time and temperature provided by the electronic cookbook 230 may be used to eliminate mistakes by the user when setting the heating source output. In some embodiments, the electronic cookbook 230 may be in signal communication with one or both of the heating source system 246 or the cooking device system 282 in order to keep the food environment at a precise temperature set forth in a recipe. This may be done using measurements of temperature of the food environment, and further by modulating the power applied to the heating source system 246 (e.g., heating units of the heating system). Examples of this are discussed above with regard to FIGS. 1A and 1B.

Figure 22:
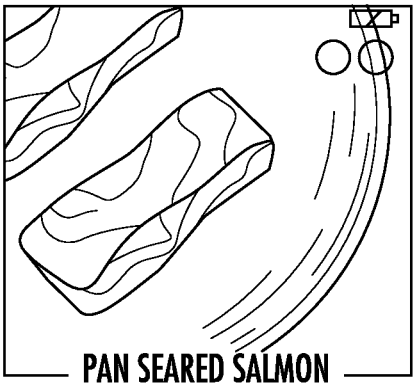
FIGS. 22-28 are example displays presentable by an electronic cookbook according to various embodiments.
Figure 23:
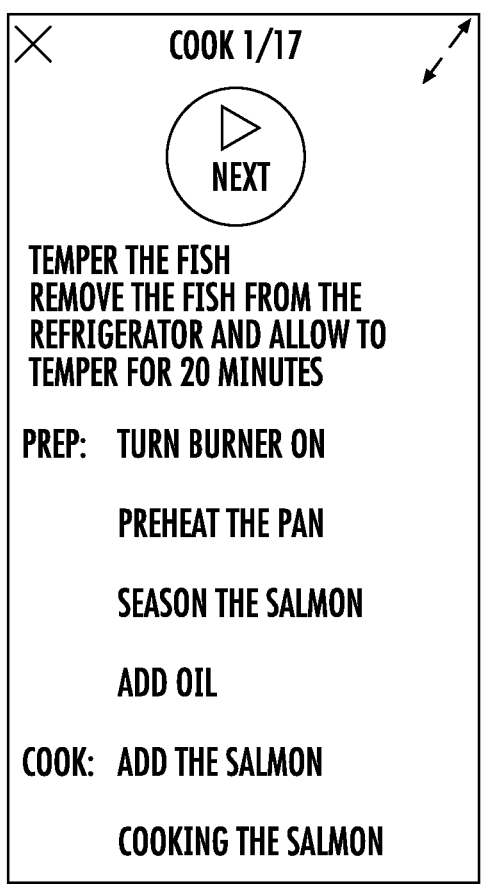
Figure 24:
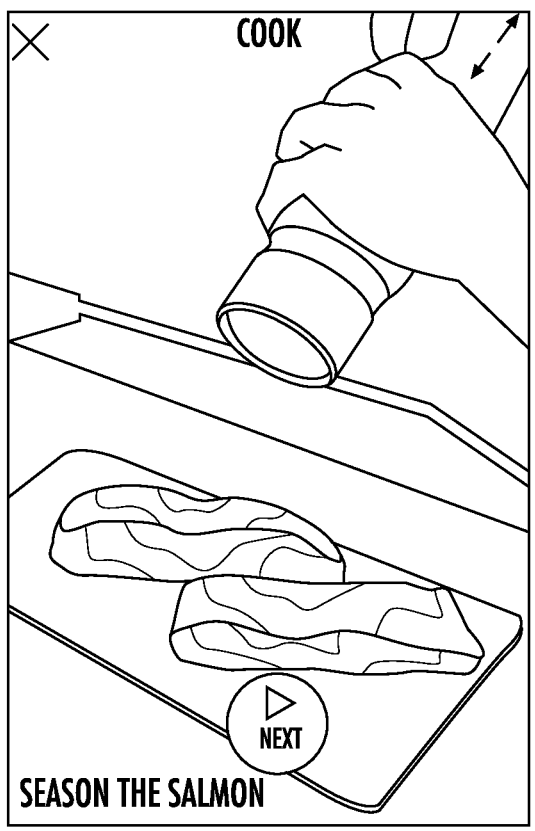
Figure 25:
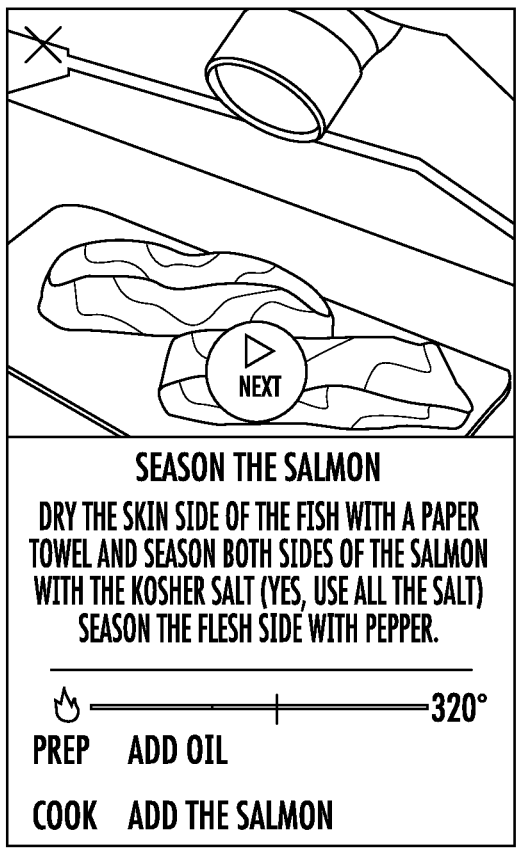
Figure 26:
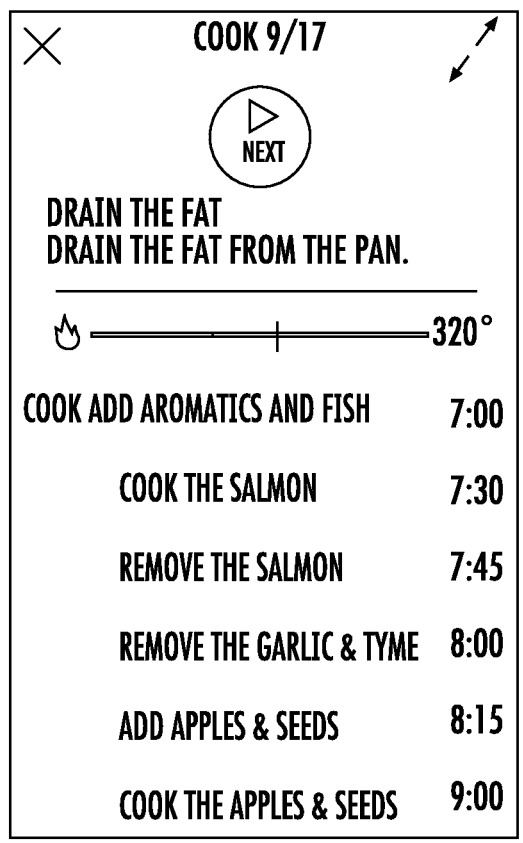
Figure 27:
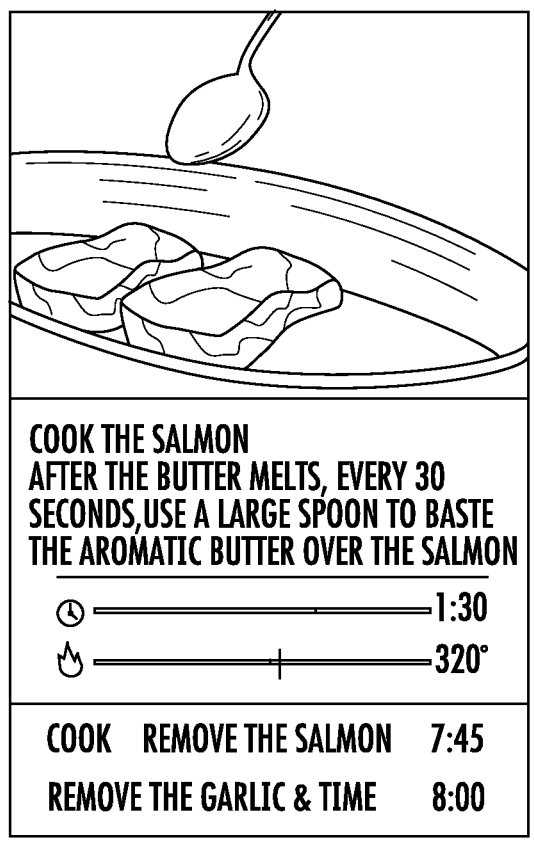
Figure 28:
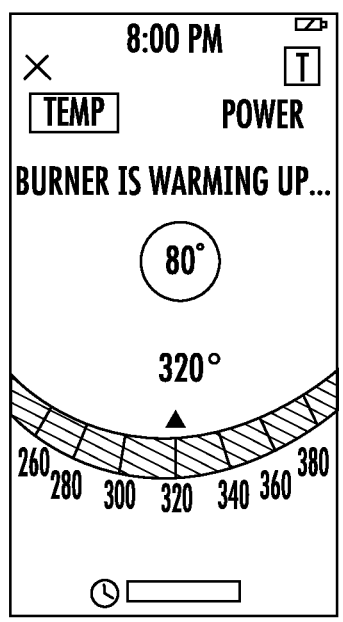
Figure 28:
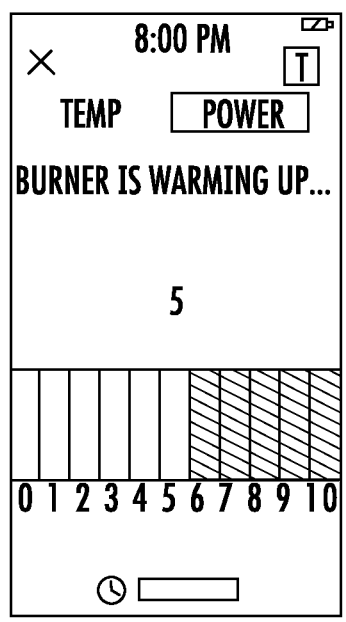
Figure 28:
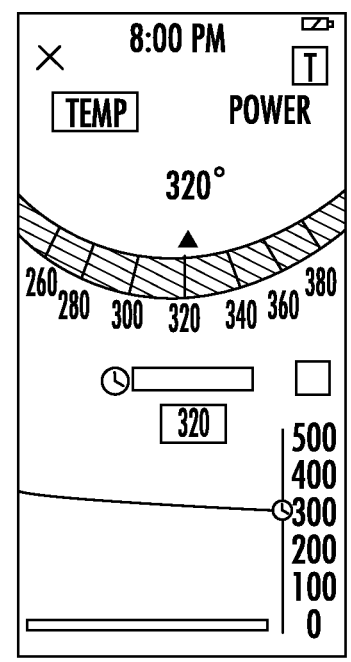

Example screenshots displayed by the electronic cookbook 230 on the computing device 214 (e.g., a wireless device, or any other device), are illustrated in FIGS. 22-28. FIG. 22 shows a recipe detail display for pan seared salmon, providing prep and cooking times, servings, and ingredients. FIG. 23 shows a display for a step in the pan seared salmon recipe for tempering the fish. FIG. 24 shows a display for a step in the pan seared salmon recipe for seasoning the salmon. The display includes a next button that the user may interface with to continue to the next step. FIG. 25 shows a detail display for a step in the pan seared salmon recipe for seasoning the salmon. The display includes instructions, a heating display, cooking time sequence, and a button that a user may interface with to advance within the step or to a next step. FIG. 26 shows a detail display for a step in the pan seared salmon recipe for draining the fat. The display includes instructions, heating temperature display, cooking time sequence, and a button to advance within the step or to a next step. FIG. 27 shows a detail display for a step in the pan seared salmon recipe for cooking the salmon. The display includes instructions, heating temperature display, and cooking time sequence. FIG. 28 shows various heating displays that may be presented to the user. Panel A shows a temperature heating display during warm up of the heat source 250 that includes the target temperature, current temperature, and visual representations of both. Panel B shows a power heating display during warm up of the heat source 250 that includes the current power and a visual representation of the power output relative to total output. Panel C shows a temperature heating display including a graph showing temperature over time.

The electronic cookbook 230 may allow users, such as novice cooks, to obtain professional results because the precise control of temperature and timing afforded by the electronic control may, in some examples, provide reproducible results, not requiring the use of a chefs expertise in judging doneness from a combination of the feel, texture, and color of the food during the cooking process. In some embodiments, the electronic cookbook 230 may be configured to provide expert guidance in the preparation of ingredients before cooking to assist the user in achieving optimal results. In these or other embodiments, the electronic cookbook 230 may provide expert guidance in one or more finishing steps after cooking to assist the user in achieving optimal results. In one embodiment, the electronic cookbook 230 may provide expert guidance in one or more finishing or preparation steps before, after, or during cooking to assist the user in achieving optimal results.

The electronic cookbook 230 may provide additional content, which may be optional selectable content, that may be used to increase the user's skill level and judgment of foodstuffs being at a stage to start another stage in a recipe, such as from a combination of the feel, texture, and color of the food during the cooking process. This guidance may be available (e.g., optionally available) at various stages or at each stage in the recipe, and may include a display of a picture or video regarding techniques such as cutting, dicing, filleting, mixing, or stiffing. A display may also include pictures or video regarding a desired appearance of food after the successful completion of a step. As an example, after the electronic cookbook 230 provides an instruction to dice carrots to a particular size, the user may optionally view a video of a suitable dicing technique, and/or the user may optionally view a video or picture of the desired prepared ingredients (e.g., how the diced carrots should look when prepared, at the end of the step).

In various embodiments, the computing device 214 may comprise a handheld computing device (such as a smartphone or a tablet computer (e.g., an iPad™)), a small projection display, a conveniently located display built into an appliance (e.g., a front panel display on a refrigerator), or a virtual reality or augmented reality display device in use by a user to allow a user to easily view, receive, or play the recipe instructions. Display aspects of the electronic cookbook 230, for example, may better illustrate complicated preparation techniques compared to text. In some embodiments, the electronic cookbook 230 may include reminders to users of proper or safe ways to use cookware or utensils. The electronic cookbook 230 may also be configured to avoid mistakes or oversights by deploying check lists, reminders, and/or timers, which may leave little room for ambiguity. Such features may be optional and selectable by the user. Display features may provide a user with important information from which to decide whether to attempt a recipe. For example, a user may preview a recipe by skipping forward through the steps of the recipe to view complicated or time consuming steps before attempting them. In one embodiment, the electronic cookbook 230 comprises a search function allowing the user to search specific foods, steps, heat source, difficulty, dietary nutrients or calories per serving, prep time, cook time, cost, or other search criteria to assist users with menu planning or special diets.

In one embodiment, the electronic cookbook 230 may display text of the steps of a recipe alongside a video demonstration of the step, with an audio track optionally playing one or both of the video demonstration sound track or the text portion. For example, a traditional recipe typically lists the ingredients and equipment and, at times, the preparation and cooking time. The electronic cookbook 230 may be configured to present aspects of a traditional recipe in addition to any combination of a static image and a first video segment, which could be a still or a pan shot showing the ingredients or what the finished dished looks like with nutritional information and preparation time in the text portion.

The first or following step of the recipe may illustrate how to prepare the ingredients, such as for example by chopping, slicing, dicing, mixing, etc. The next steps may be presented in the order of cooking and then the final presentation.

The following table outlines an example display format for a recipe displayed by the electronic cookbook 230, in which each line in the table lists the content that may be displayed, and each line would be a separate display or portion of a scrollable display from other portions.

| Optional Video or image content | Optional Audio Content | Text, UI or GUI |
|---|---|---|
| Video or still image of the finished, dished food item | The video narrative or reading the text | Title of the recipe or food item, and optionally preparation time, calories and other nutritional information<br>Map of the stage (or step) in the recipe and control icons to skip ahead (all steps), forward, and backward, i.e. one or more navigation icons between stages (or steps), and content selection (video, picture and/or audio), now referred to as Navigation icons |
| Video pan of the ingredients, still shots of ingredients, or videos of one ingredient after another | The video narrative or reading the text | List of ingredients and quantities<br>Navigation icons |
| Video of the preparation procedure | The video narrative or reading the text | How to prepare or mix the ingredients, such as "fine dice the celery and onions"<br>Navigation icons |
| Video of the preparation step | The video narrative or reading the text | Pre-heating the oven, cookware, etc.<br>Navigation icons<br>Heat source system 246 and cooking device system 282 confirmation and pairing in signal communication<br>Navigation icons |
| Video of the cooking procedure, showing exactly what the food should look like when it is properly cooked, optionally a running timer showing how long the step should take at the proper temperature | The video narrative, reading the text, or alarm when the cooking stage should be finished | Cooking procedure: Text and icons for transmitting instruction to the heat source system 246, explaining when to turn or mix the food, how to tell when it is done, |

| Optional Video or image content | Optional Audio Content | Text, UI or GUI |
|---|---|---|
| | | when to put it aside for the next stage icons or text showing remaining cooking time navigation icons |

From the above non-limiting example of the type of information that may be displayed by the electronic cookbook 230, it can be appreciated that recipes generally involve some stage of preparation, such as gathering and measuring ingredients, and mixing or cooking stages. Using the above recipe display format, a user may move within a recipe between display of the stages or steps to be followed, the techniques, and the appearance of the food to obtain a full appreciation of the recipe.

In one beneficial aspect, when a recipe includes complex steps, such as novel preparation techniques, a user may interface with the electronic cookbook 230 to visually verify that the food the user has prepared has the proper appearance, texture, or color at one or more stages of the recipe. Therefore, before navigating to the next step in the recipe, the user may navigate through images or other content, such as text, to verify satisfactory completion of the current step or stage. The electronic cookbook 230 may also use image recognition algorithms on images of the cooking process taken by one or more cameras that are part of the computing device 214 (or any other device in communication range of the computing device 214) in order to provide feedback to the user on proper appearance, texture, color, or doneness of the food.

A user may desire to interface with the electronic cookbook 230 without touching the electronic cookbook 230 (e.g., without touching the computing device 214 executing the electronic cookbook 230). For example, a user may desire to indicate an operation such as "advance a step," "repeat a step," "watch a video providing more information regarding a step or technique," "switch to another set of steps for a different recipe," etc. However, the user may desire to avoid contacting the electronic cookbook 230 with their hands to provide such operation. For example, the electronic cookbook 230 may be out of reach, or the user's hands may be full or dirty. Touching the electronic cookbook 230 with dirty hands may be undesirable because the excess material on the user's hands may transfer to the user interface through which the user indicates an operation to the electronic cookbook 230. The transferred material may inhibit the sensing capabilities of the device. For example, the transfer of such material to a touch sensor may impair sensing capability. Similarly, the transfer of material to a graphical user interface may blur the display. Preventing such contamination may require repeated or excessive cleaning of the hands and the electronic cookbook 230 itself.

Still referring to the schematic shown in FIG. 2, the cooking system 210 may include an auxiliary button system 300 operable to allow the user to indicate an operation with respect to the electronic cookbook 230 without touching the electronic cookbook 230 (or, in some examples, without touching another device that is executing the electronic cookbook 230, that is performing the operations of the electronic cookbook 230, and/or that is displaying one or more displays of the electronic cookbook 230). Thus, incorporation of the auxiliary button system 300 with the operation of the electronic cookbook 230 may allow a user to access the instructions and supporting content of a recipe without contacting the electronic cookbook 230, even when the electronic cookbook 230 is in signal communication with the heat source system 246 or cooking device system 282. Upon receiving the indication from the user, the electronic cookbook 230 may respond to the indication as described above with respect to the cooking system 10 of FIGS. 1A and 1B.

As is illustrated, the auxiliary button system 300 includes an auxiliary button module 315 and an auxiliary device 313. The auxiliary button module 315 may represent one or more components that allow a user to indicate an operation with respect to the electronic cookbook 230. Details regarding the auxiliary button module 315 are discussed further below.

The auxiliary device 313 may be any device that is separate from the electronic cookbook 230 (and/or a device performing the operations of the electronic cookbook 230). For example, if a computing device 214 (such as a tablet) is performing the operations of the electronic cookbook 230, the auxiliary device 313 may be any device that is separate from the computing device 214 (such as a cooking utensil or a second computing device). Examples of an auxiliary device 213 may include a cooking or food heating appliance (e.g., refrigerator, oven, range, grill, scale, slow cooker, dishwasher, microwave, rice cooker, pressure cooker, pan, skillet, etc.), a cooking device or vessel (e.g., pan, skillet, etc.), a cooking surface (e.g., cutting board, countertop, etc.), a cooking utensil (e.g., spoon, fork, tongs, knife, etc.), a support system for the electronic cookbook 230 (e.g., a case, cover, or stand that the electronic cookbook 230 and/or computing device 214 may be inserted into or otherwise supported by), an auxiliary display (e.g., glasses, projector, etc.), a wearable device (e.g., watch, apron, belt, etc.), or any other device that is separate from the electronic cookbook 230 (and/or a device performing the operations of the electronic cookbook 230).

In some embodiments, the auxiliary device 313 may be the heat source system 246 and/or the heat source 250 that is being controlled by (or that is communication with) the electronic cookbook 230. For example, the auxiliary device 313 may be an oven that is being used to cook a food item in accordance with the recipe included in the electronic cookbook 230. In some embodiments, the auxiliary device 313 may be the cooking device system 282 and/or the cooking device 286 that is being controlled by (or that is communication with) the electronic cookbook 230. For example, the auxiliary device 313 may be a pot that is being used to cook a food item in accordance with the recipe included in the electronic cookbook 230.

In some embodiments, by being separate from the electronic cookbook 230, the user can touch the auxiliary device 313 without touching the electronic cookbook 230. This may allow the user to indicate an operation with respect to the electronic cookbook 230 without touching the electronic cookbook 230 (or, in some examples, without touching another device that is executing the electronic cookbook 230, that is performing the operations of the electronic cookbook 230, and/or that is displaying one or more displays of the electronic cookbook 230). This may allow the electronic cookbook 230 to be placed remotely from the cooking workspace (e.g., out of the way of the mess), but still allow the user to navigate through the electronic cookbook 230 (page by page or step by step of the recipe) using the auxiliary button system 300. Thus, the user may avoid contacting the electronic cookbook 230 and contaminating it as they work (e.g., previewing or executing the recipe).

Although the auxiliary device 313 has been described above as being separate from the electronic cookbook 230, in some examples the auxiliary device 313 may not be separate from the electronic cookbook 313. For example, the auxiliary device 313 may include a processor that is performing one or more of the operations of the electronic cookbook 230. As another example, the auxiliary device 313 may include a screen (or display) that can display portions of the electronic cookbook 230 to the user. In such examples, the portion of the auxiliary device 313 that may be touched by the user (to indicate an operation with respect to the electronic cookbook 230) may be separate (or separatable) from the portion of the auxiliary device 313 that is being used by the electronic cookbook 230. For example, the auxiliary device 313 may be a tablet that performs the operations of the electronic cookbook 230 and/or displays portions of the electronic cookbook 230 to the user. Despite this, the tablet may include one or more buttons that may be removed from the tablet for washing, or that may be positioned in a location of the tablet that may be washed. In still another embodiment, the auxiliary button system 300 may be a voice command system that is integrated with the computing device 214. In such an example, the computing device 214 may receive voice commands for the operation of the electronic cookbook 230, which may prevent the user from contacting the computing device 214 or the electronic cookbook 230.

As is illustrated, the auxiliary button system 300 further includes an auxiliary button module 315 having, for example, an auxiliary button interface 319 (which may include one or more auxiliary buttons 323) that allows the user to indicate an operation to the electronic cookbook 230, such as advancing through stages or steps of a recipe in the electronic cookbook 230. The auxiliary button module 315 further has a notification device 357. Examples of these components are discussed further below.

Figure 3:
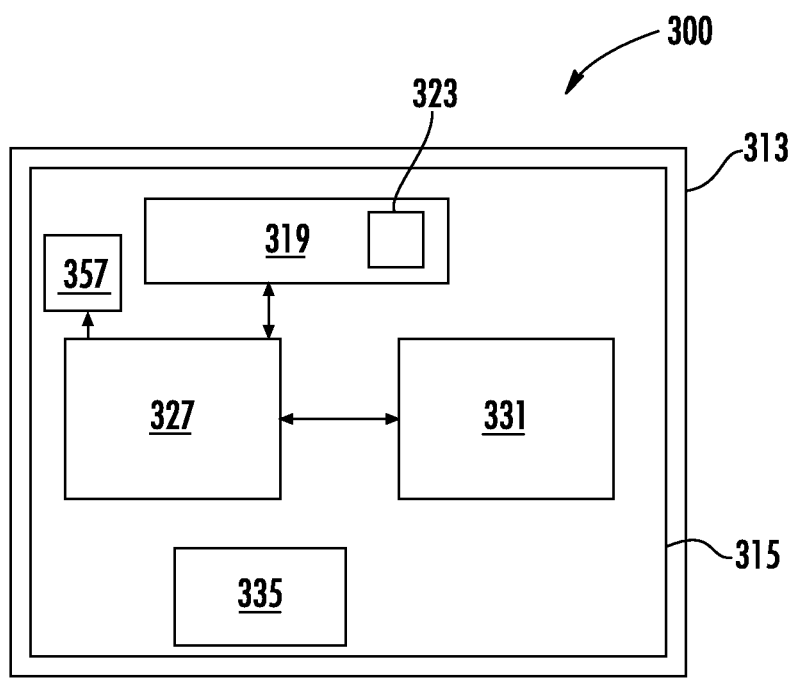
FIG. 3 schematically illustrates various hardware units of an auxiliary button system according to various embodiments.

FIG. 3 schematically illustrates various hardware units of an auxiliary button system 300 according to various embodiments. The auxiliary button system 300 may include an auxiliary device 313 (as is described above) and an auxiliary button module 315. The auxiliary button module 315 may have an auxiliary button interface 319, operation circuitry 327, communication circuitry 331, and a power source 335 for providing power to the auxiliary button system 300. The auxiliary button module 315 further includes a notification device 357 energizable to provide notifications to a user or to prompt the user.

The interface 319 is a user interface through which a user may interface with the electronic cookbook 230 to indicate a desired operation (which may include completion of a step or recipe instruction). The interface 319 may include one or more auxiliary buttons 323 (examples of which are illustrated in FIGS. 4-21) that may allow the user to indicate the desired operations.

The auxiliary buttons 323 may be configured to interface the user with the electronic cookbook 230 by providing a platform through which operations may be indicated. Although any suitable apparatus that allows a user to provide an indication may be used, in various embodiments, auxiliary buttons 323 may include an actuatable button or switch, tap surface, touch screen display, membrane switch, voice command receiver/microphone, or an area through which a user's motion may be detected, for example. In these or other embodiments, the interface 319 or auxiliary button 323 may comprise or be operatively associated with a touchscreen, microphone, motion sensor, capacitance sensor, or vibration sensor to receive (e.g., sense or detect) the indication provided by the user. Auxiliary buttons 323 may be configured to indicate any suitable operation. Example operations may include "advance to the next step," "return to a previous step," "return to the beginning," "repeat the current step," "pause the step instructions," "turn off the video display," "turn off the audio," "turn off the heating system," "switch the display device," "switch to another heating unit of the heating system," "switch to instructions for another recipe," "provide an updated step," "turn off the auxiliary button," "modify the auxiliary button sensitivity," or "refresh the device pairing." As introduced above, the interface 319 may include one or more auxiliary buttons 323. In some embodiments, interface 319 includes two or more auxiliary buttons 323 that are located at different regions of a surface of the auxiliary device 313.

In one embodiment, the interface 319 includes a microphone operable to sense audio instructions provided by the user. In another embodiment, the interface 319 includes an environment through which the user may indicate an operational instruction. For example, an auxiliary button 323 may be defined by a region wherein the user may wave a hand in a first direction to indicate a first operation (such as "advance to next step"), and wave the hand in a second direction to indicate a second operation (such as "return to a previous step"). Other movements may also be used in addition to or instead of waving a hand in a particular direction or location to indicate these or other instructions.

The interface 319 may comprise or be operatively associated with the operation circuitry 327, allowing the operation circuitry 327 to receive the indicated operation. For example, the operation circuitry 327 may be operatively coupled to the interface 319 to electrically receive the indicated operation from the interface 319 or one or more auxiliary buttons 323 thereof. The communication circuitry 331 may be configured to receive the indicated operation (e.g., in the form of an electrical signal) from the operation circuitry 327 and transmit the signal to the electronic cookbook 230. In one embodiment, the communication circuitry 331 may be further configured to receive environmental data transmitted by the heat source system 246 or the cooking device system 282.

As is illustrated in FIG. 3, the operation circuitry 327 is operatively coupled with the interface 319 to electrically receive the indicated operation from the interface 319. In some embodiments, the operation circuitry 327 is operable to translate the interaction of the user at the interface 319. In various embodiments, the operation circuitry 327 comprises an electrical switch or transducer configured to translate the indication of the user to an electrical signal. For example the operation circuitry 327 may comprise an audio sensor, a motion sensor (accelerometer, microwave, infrared ray, electric, reflective, vibrational, ultrasonic, etc.), thermal sensor, vibration sensor, pressure sensor, light sensor, or capacitance sensor. Those having skill in the art will appreciate that other methods of sensing, receiving, or translating the indicated operation from the interface 319 may be used.

The communication circuitry 331 is configured to receive the electrical signal from the operation circuitry 327 and transmit the signal to the electronic cookbook 230. The communication circuitry 331 may comprise a transmitter configured to transmit the signal. The signal is receivable by the electronic cookbook 230. Thus, indication of an operation at the interface 319 by the user may cause the communication circuitry 331 to transmit the signal which, when received by the electronic cookbook 230, provides the operation instruction indicated by the user at the auxiliary button system 300.

In various embodiments, the communication circuitry 331 includes a transmitter and a receiver or transceiver adaptable for two-way communication. Two-way communication may comprise a 1:1 connection wherein the auxiliary button system 300 may pair with the electronic cookbook 230. Such a connection may be similar to that described above with respect to the 1:1 connection between the electronic cookbook 230 and the heat source system 246. In this or another embodiment, the communication circuitry 331 of the auxiliary button system 300 may be configured to provide periodic signals or advertisements providing a unique identifier (such as a device ID) which may be used by the electronic cookbook 230 to identify signals transmitted by the auxiliary button system 300.

Communication circuitry 331 may be configured for wireless communication with the electronic cookbook 230. Thus the communication circuitry 331 comprises a wireless transmitter configured to transmit the signal via one or more electromagnetic transmissions (e.g., a radio transmission, microwave transmission, infrared transmission, magnetic transmission, light transmission, the creation or manipulation of an electric field, or any combination thereof). Wireless transmissions may be over one or more networks such as the Internet (e.g., using a TCP communications protocol), a Wi-Fi network, a cellular network, a radio telecommunication network, a Bluetooth network, a NFC network, or other suitable wireless network.

In some embodiments, the communication circuitry 331 may be configured for wired communication in addition to or instead of wireless communication. For example, the auxiliary device 313 may be connected to the electronic cookbook 230 via a wired connection.

The communication circuitry 331 may also be configured to receive notification signals, which may include notification signals to prompt the user as described above. The operation circuitry 327 may be operable to energize one or more notification features along the interface 319. For example, the operation circuitry 327 may energize one or more lights to notify the user of an indicator button on the display screen or to prompt the user to confirm an action with respect to execution of a step in the recipe. For example, the interface may energize an LED or other light adjacent to or along the auxiliary button 323 to prompt or notify the user.

It will be appreciated that the interface 319, operation circuitry 327, and communication circuitry 331 may share hardware components operable to perform the operations described herein with respect to the interface 319, the operation circuitry 327, and the communication circuitry 331. The interface 319, operation circuitry 327, and communication circuitry 331 may further comprise a processor having memory for containing instructions executable by the processor. Such a processor and memory may be used to perform the operations described herein with respect to the interface 319, operation circuitry 327, and communication circuitry 331.

As introduced above, the auxiliary button system 300 may include an auxiliary device 313 configured to allow a user to remotely (with respect to contact with the electronic cookbook 230) indicate an operation. The auxiliary device 313 may comprise or be associated with the interface 319. The interface 319 may be associated with or integrated with the auxiliary device 313. In some embodiments, the auxiliary device 313 or auxiliary button module 315 may be a dedicated or standalone device having a body, such as a housing, configured to be stably positioned or adhered to a surface (e.g., cabinet door, faucet, wall, countertop, etc.).

Figure 10:
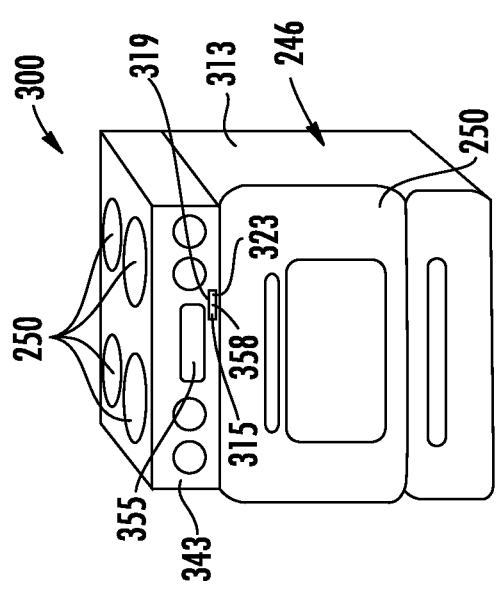
FIG. 10 illustrates an auxiliary button system where the auxiliary device is a heat source system, according to various embodiments.

In some embodiments, the auxiliary device 313 is a multifunctional device. In some such embodiments, the auxiliary device 313 or auxiliary button module 315 may be components of the heat source system 246 or cooking device system 282. In other such embodiments, the auxiliary button module 315 is integrated with or removably attachable to a device body 343 (an example of which is seen in FIG. 10) of an auxiliary device 313 to form a multifunctional device. The auxiliary device 313 may include, for example, a separate or additional display device. The auxiliary device 313 may therefore be configured to allow a user to remotely indicate an operation, and may further be configured to display a separate or additional display. In another embodiment, the auxiliary device 313 may be separate from a separate or additional display. In one such embodiment, a separate or additional display may not be used.

In one embodiment where the auxiliary button module 315 is integrated or attached to a component of a cooking device system 282 (such as a cooking device 286), the communication circuitry 331 of the auxiliary button module 315 may operate in conjunction with the communication circuitry of a cooking device 286 (such as a smart cooking vessel). As such, the indicated operation (e.g., signal) may be transmitted to the electronic cookbook 230 via a connection established between the electronic cookbook 230 and the cooking device system 282. In some such embodiments, transmission of the indicated operation may use the same communication apparatus. For example, the communication circuitry 331 may transmit the signal to the electronic cookbook 230 within a connection, format, pairing, network, or signal transmitted or established between the electronic cookbook 230 and cooking device system 282 (e.g., the cooking device 286). In one such embodiment or a different embodiment, the cooking device system 282 or the communication circuitry 331 of the auxiliary button module 315 may communicate the signal to a component of the heat source system 242 for routing to the electronic cookbook 230.

In one embodiment where the auxiliary button module 315 is integrated or attached to a component of a heat source system 246, the communication circuitry 331 of the auxiliary button module 315 may operate in conjunction with the communication circuitry 331 of the heat source system 246 such that the indicated operation instruction (e.g., signal) may be transmitted to the electronic cookbook 230 via the connection established between the heat source system 246 and the electronic cookbook 230. For example, the communication circuitry 331 may transmit the signal to the electronic cookbook 230 within a connection, format, pairing, network, or signal transmitted or established between the electronic cookbook 230 and the heat source system 246. In one such embodiment or a different embodiment, the heat source system 246 or the communication circuitry 331 of the auxiliary button module 315 may communicate the signal to a component of the cooking device system 282 for routing to the electronic cookbook 230.

To communicate with the electronic cookbook 230, the auxiliary button system 300 may broadcast an identifier or any other data that may be used by the electronic cookbook 230 to identify nearby devices. The user may then be presented with a list of such devices for selection and subsequent pairing. In some embodiments, the electronic cookbook 230 may include (or the user may set) a rule with respect to initiating or maintaining pairing with available devices (e.g., proximity, identity, use, etc.). For example, the electronic cookbook 230 may also use the strength of broadcast signals from auxiliary button systems 300 to determine which are nearby. The electronic cookbook 230 may also use technology such as NFC to determine which auxiliary button systems 300 are nearby.

Figure 4:
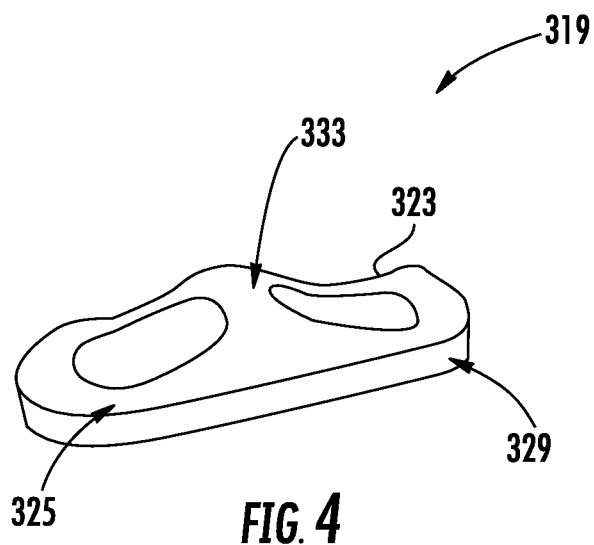
FIG. 4 illustrates an interface of an auxiliary button system according to various embodiments.

FIG. 4 illustrates an example of an interface 319 comprising one or more buttons 323 positioned along the interface 319 between a first end 325 and a second end 329. The first end 325 may be contacted or actuated to indicate an operation, and the second end 329 may be contacted or actuated to indicate another operation. Contacting or actuating the first end 325 may be used to indicate to the electronic cookbook 230 the same or different operation as contacting or actuating the second end 329. For example, a user may contact or actuate the first end 325 to indicate "advance to a next step," or contact or actuate the second end 329 to indicate "return to the previous step." In this or another embodiment, the user may contact or actuate the one or more buttons 323 along a central region 333 to perform another operation or to present a selectable list of additional operations on the display through which the user may toggle through using contact or actuation of the first end 325 or second end 329. In one embodiment, the auxiliary button 323 shown in FIG. 4 may be configured to notify the user of an indicator button on the display screen or to prompt the user to confirm an action with respect to execution of a step in the recipe. For example, the interface may energize an LED or other light adjacent to or along the auxiliary button 323 to prompt or notify the user.

Figure 5:
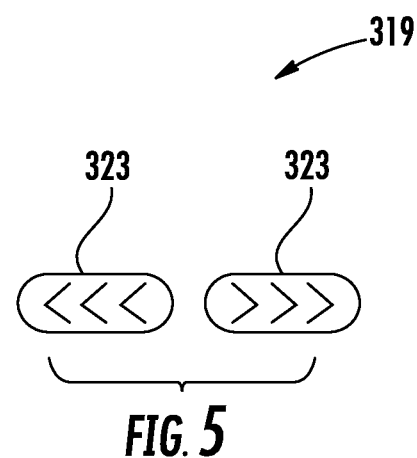
FIG. 5 illustrates an interface of an auxiliary button system according to various embodiments.

FIG. 5 illustrates an example of an interface 319 comprising two buttons 323 contactable by a user to indicate operations to the electronic cookbook 230. In one example of the operation of such an embodiment, a user may press the button 323 on the left to "return to a previous step" or the button 323 on the right to "advance to a next step." In one embodiment, when the user presses the button 323 on the left, a menu may appear listing additional operation instructions from which the user may select by pressing the button 323 on the right. In one embodiment, the auxiliary button 323 shown in FIG. 5 may be configured to notify the user of an indicator button on the display screen or to prompt the user to confirm an action with respect to execution of a step in the recipe. For example, the interface 319 may energize an LED or other light adjacent to or along the auxiliary button 323 to prompt or notify the user.

Figure 6:
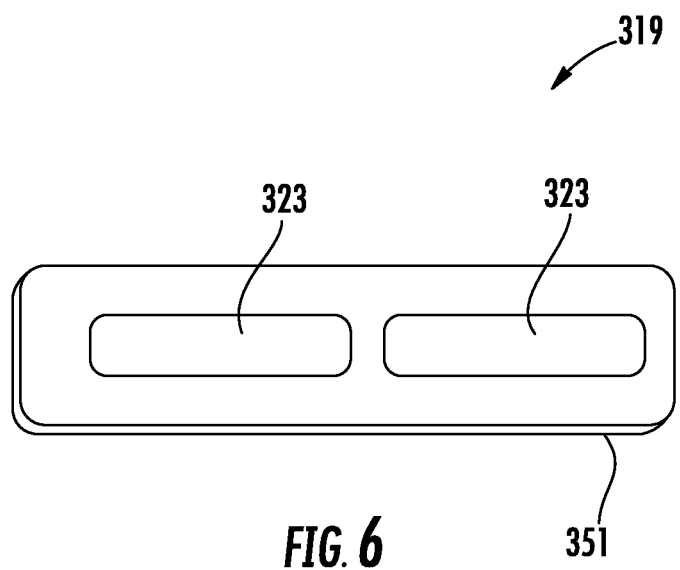
FIG. 6 illustrates an interface of an auxiliary button system according to various embodiments.

FIG. 6 illustrates another example of an interface 319 comprising a touchpad 351. The touchpad 351 may include one or more buttons 323 that the user may contact or come in proximity of to indicate an operation instruction. The touchpad 351 may operate by sensing capacitance of the user, for example. In another embodiment, touchpad 351 may comprise a tap pad operable to sense vibrations of a user resulting from the user tapping the surface of the touchpad 351. In various embodiments, the touchpad 351 may comprise a lighted display, static image, or region designated as a button 323. In one embodiment, the interface 319 is configured to detect a change in light when a user contacts or comes in proximity to the button 323 on the touchpad 351. In another embodiment, the interface 319 is configured to detect a change in temperature when the user contacts or comes in proximity of the button 323 on the touchpad 351. In one embodiment, the auxiliary button 323 shown in FIG. 6 may be configured to notify the user of an indicator button on the display screen or to prompt the user to confirm an action with respect to execution of a step in the recipe. For example, the interface 319 may energize an LED or other light adjacent to or along the auxiliary button 323 to prompt or notify the user.

In various embodiments, one or more buttons 323 of an interface 319 may comprises soft buttons 323. For example a user may designate (e.g., program, select, or define) one or more buttons 323 to indicate a desired operation. For example, the electronic cookbook 230 or the auxiliary button system 300 may be configured with an application accessible by the user to designate operations indicated by a button 323. In one embodiment, a touchpad (which may be similar to touchpad 351) includes multiple user modifiable buttons 323 allowing the user to designate buttons 323 to indicate operations selected from a list of available operations. In a further embodiment, a user may modify the shape, size, and/or location of a button 323 on a touchpad.

As introduced above, the auxiliary button system 300 may be configured to provide notifications to the user via a notification device 357. The notifications may be used to prompt a user to indicate an operation, or to provide confirmation of an action associated with execution of an electronic cookbook recipe. In various embodiments, a notification may be provided when the electronic cookbook 230 or display is displaying an indicator button, such as a "next" button, or requesting indication of an operation with respect to a step in a recipe. For example, when the display device displays an interface button requesting confirmation of completion of a recipe step or portion thereof, the user may be provided with a notification to prompt action. In one example, during execution of a recipe, when an interface button for indicating an operation or confirmation is displayed on the display, the electronic cookbook 230 may communicate (e.g., transmit a signal) the presence or availability of the indicator button to the auxiliary button module 315 or an auxiliary device 313 (e.g., a component of the heat source system 242, cooking device system 282, a separate or additional display device, or other auxiliary device 313, such as a smart TV or computer). Upon receiving the signal, the auxiliary button system 300 may be configured to energize the notification device 357 to notify the user of the presence or availability of the indicator button.

Notification devices 357 may include energizable lights associated with the auxiliary button module 315 or an auxiliary device 313. For example, the interface 319 may include one of more lights operative to be energized by the electronic cookbook 230 or display device signal. Notifications may include illumination, blinking, intensifying, color changes, or other visible lighting. In one embodiment, one or more notification lights of a notification device 357 may underlie or otherwise appear to light up an auxiliary button 323 that may be used to provide the indicated operation. In another embodiment, the notification device 357 may include the interface 319 producing an image of (or light representative of) an auxiliary button 323 that may be contacted by the user to provide the indicated operation (e.g., on a lighted touch screen display). In one embodiment, one or more notification lights of a notification device 357 may be located near an auxiliary button 323. Notification devices 357 may include other notification components and mediums (e.g., speakers to provide audible notifications). Accordingly, the auxiliary button system 300 may include a notification device 357 configured to provide remote notifications to the user of availability of interfacing with the electronic cookbook 230 via an auxiliary button 323. The notifications may improve sequencing of the recipe step and avoid delays due to repeated viewing of the display. In one embodiment, advancing through a step in the recipe (as a result of an indication of an operation instruction to "advance to a next step," for example) is operative to energize a heat source 250 or heat a cooking device 286 to at least one of a power level or a temperature set point. In one embodiment, a sensor output of the heat source system 246 or heat device system 282 may also be deployed by the electronic cookbook 230 to modulate the thermal output of the heat source 250 in accordance with a stage of the recipe. In one embodiment, a sensor output may be used to advance the recipe display.

Figure 7A:
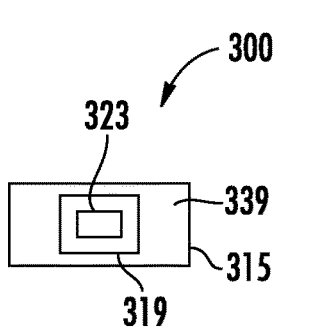
FIG. 7A schematically illustrates an auxiliary button system that includes an auxiliary button module having a device body, according to various embodiments.

FIG. 7A schematically illustrates an embodiment of an auxiliary button system 300 that includes an auxiliary button module 315 having a device body 339. The device body 339 may allow the auxiliary button module 315 to be used a standalone device. In such an example, the auxiliary button module 315 may be operated even when it is not attached (or otherwise coupled) to another auxiliary device 313.

Figure 7B:
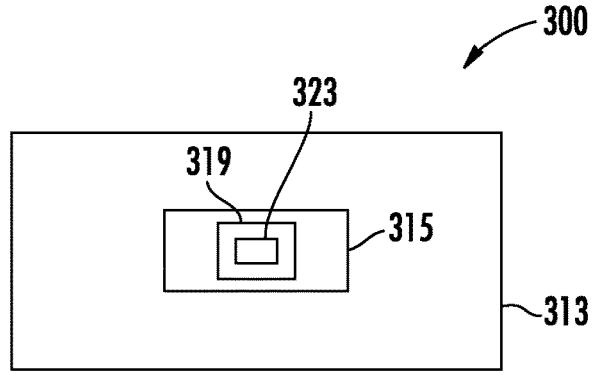
FIG. 7B schematically illustrates an auxiliary button system that includes an auxiliary button module that is integrated with an auxiliary device, according to various embodiments.

FIG. 7B schematically illustrates an embodiment of an auxiliary button system 300 that includes an auxiliary button module 315 that is integrated with an auxiliary device 313. The integrated auxiliary button module 315 may have a device body 339 (as is discussed above), or it may not have a device body 339. In embodiments where the integrated auxiliary button module 315 does not include a device body 339, each of the components of the auxiliary button module 315 may be integrated directly into the auxiliary device 313.

Figure 8:
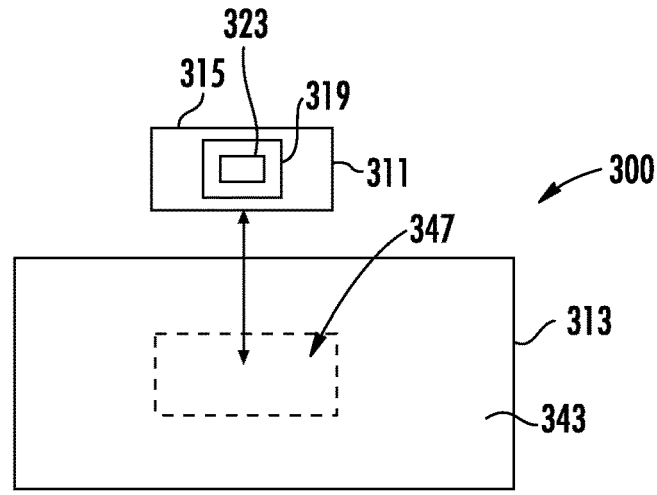
FIG. 8 schematically illustrates an auxiliary button system that includes an auxiliary button module that is removably attachable to the auxiliary device, according to various embodiments.

FIG. 8 schematically illustrates an embodiment of an auxiliary button system 300 that includes an auxiliary button module 315 that is removably attachable to the auxiliary device 313. The auxiliary button module 315 may be removably attachable to a device body 343 of the auxiliary device 313 at an attachment site 347 as indicated by the arrow. In some embodiments, the device body 343 may include two or more attachment sites 347 configured to receive one or more auxiliary button modules 315. The attachment site 347 may include a fitting to releasably retain the auxiliary button module 315 on the auxiliary device 313. One or more auxiliary buttons 323 may be included on or may be positioned on the auxiliary button module 315 so as to be illuminated to provide notifications or prompts to the user. In various embodiments, the attachment site 347 may include hooks, latches, grooves, tabs, threads, adhesive, compressible fittings, or other suitable features configured to engage and removably retain the auxiliary button module 315.

As is illustrated, the auxiliary button module 315 may include the interface 319, operation circuitry 327, communication circuitry 331, and power source 335. Furthermore, the auxiliary button module 315 may also include a device body 339, which may allow the auxiliary button module to be used as a standalone device when the auxiliary button module 315 is not attached to the auxiliary device 313. In such embodiments, the auxiliary button module 315 may be configured to transmit indicated operation instructions to the electronic cookbook 230 both while operating as a standalone device, and also while attached to the auxiliary device 313.

Figure 9:
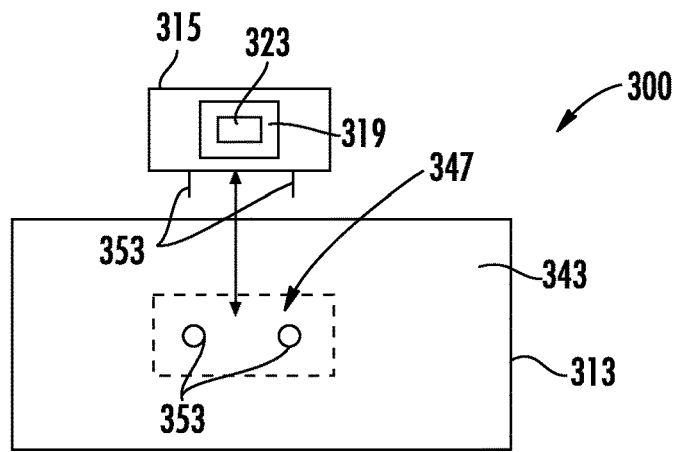
FIG. 9 schematically illustrates an auxiliary button module that is configured for operative attachment to the device body of the auxiliary device, according to various embodiments.

FIG. 9 schematically illustrates a further embodiment wherein the auxiliary button module 315 is configured for operative attachment to the device body 343 of the auxiliary device 313. Operative attachment may include an attachment that provides an operative function. For example, the auxiliary button module 315 when attached to the device body 343 may form or complete the interface 319, operation circuitry 327, communication circuitry 331, or power source 335, thereby allowing operations indicated by the user to be transmitted to the electronic cookbook 230. In some embodiments, the operative attachment may also be a removable attachment. In one embodiment, the auxiliary button module 315 may contain all or a portion of the interface 319, operation circuitry 327, communication circuitry 331, or power source 335, while the auxiliary device 313 may contain all or a portion of the remaining components not included in the auxiliary button module 315. For example, the auxiliary button module 315 includes the interface 319 (or a portion of it), while the device body 343 of the auxiliary device 313 includes the operation circuitry 327, communication circuitry 331, power source 335, and the notification device 357 (not shown). However, these components (and portions of these components) may be distributed between the auxiliary button module 315 and the auxiliary device 313 in any other manner.

Operative attachment may include formation of an electrical connection between the auxiliary button module 315 and the device body 343 of the auxiliary device 313. In the example embodiment shown in FIG. 9, the attachment site 347 includes one or more electrical connections 353 (which may be outlets) to receive one or more electrical connections 353 (which may be plugs) positioned on the auxiliary button module 315. Thus, when the auxiliary button module 315 is received at the attachment site 347, one or more electrical connections are formed to provide the operational combination of the auxiliary button module 315 and auxiliary device 313. In some embodiments, the electrical coupling provided by the connections 353 may allow for a transfer of data (between the auxiliary device 313 and the auxiliary button module 315), a connection to additional storage capacity, or to provide additional operations.

Removable attachment of the auxiliary button module 315 (e.g., one or more components of the auxiliary button system 300) may improve the portability of the auxiliary button system 300. For example, in some embodiments, the auxiliary button module 315 may be moved from one location or auxiliary device 313 to another location or auxiliary device 313 before or during execution of the recipe. This may allow the user to have the auxiliary button module 300 near them (or with them) throughout the entire cooking experience. Removable attachment of the auxiliary button module 315 may also improve ease of replacement of worn or damaged components. In some embodiments, the auxiliary button system 300 comprises auxiliary button modules 315 or device bodies 339, 343 configured to allow the user to interchange auxiliary button modules 315. Such interchangeable auxiliary button modules 315 may therefore support exchange of a first auxiliary button module 315 for a second auxiliary button module 315 to, for example, provide a preferred interface 319 having different or additional operations that may be indicated by the user.

In some embodiments, components of the auxiliary button system 300 may be washable. In one embodiment, the device body 339, 343, the auxiliary buttons 323, or any other components of the auxiliary button system 300 (whether removably attached or integrated) may be washable. Washable may refer to machine washable in a conventional dishwasher, or sink washable (including submerging the auxiliary button 323, interface 319, device body 339, 343, or other components in water). Washable may also refer to spray washable, including spraying the surface of an auxiliary button module 315, auxiliary device 313, or auxiliary button 323 with a cleaning solution and subsequently wiping the surface clean. Removable attachment of the auxiliary button module 315 may allow a user to remove the auxiliary button module 315 from the device body 343 for washing one or both of the components. It will be appreciated that in some configurations, certain components (such as electrical components) could be damaged during some forms of washing (e.g., due to exposure to high temperatures or excess moisture). In some such embodiments, one or more of these components may be removable to allow the user to wash the other components in a harsher environment than the more sensitive components. The auxiliary button module 315 may be substantially sealed from moisture to prevent damage during washing. In one embodiment, the auxiliary button 323 may have a cover that may be removed by the user for ease of washing.

In various embodiments, auxiliary button modules 315 may contain circuitry specific to an indicated function such that the auxiliary button module 315 produces a same signal when operated irrespective of the auxiliary device 313 the auxiliary button module 315 may be attached to, and also irrespective of whether the auxiliary button module 315 is operating as a standalone device or as a portion of an auxiliary device 313. In other embodiments, the auxiliary button module 315 may be configured to provide a signal specified by the auxiliary device 313 or a generic signal that may be interpreted by the electronic cookbook 230 according to preselected or predetermined designations. As introduced above, the auxiliary button system 300 may be configured for dynamic designation of signals. Thus, in some embodiments, a user may define (via the electronic cookbook 230) operations indicated by one or more auxiliary buttons 323, which may be applicable to auxiliary button modules 315 containing specific or general circuitry.

FIG. 10 illustrates one embodiment of an auxiliary button system 300, where the auxiliary device 313 is a heat source system 246. As is illustrated, the heat source system 246 is an oven/range system having heat sources 250 that include an oven and burner(s). The heat source system 246 may be the illustrated heat source system 246 or a different heat source system 246, such as a barbeque grill, a microwave, a salamander, an oven, a range, or any other heat source system 246 or heat source system 46. Additionally, although FIG. 10 illustrates the auxiliary device 313 as a heat source system 246, it may be a heat source 250 or a heat source 50 instead.

The interface 319 comprising the auxiliary button 323 may be positioned along the surface of the heat source system 246 at a location that provides the user with convenient access to indicate an operation instruction. For example, the interface 319 may be positioned along a front surface of the heat source system 246, near one or more dials or displays, for example. As another example, the interface 319 may be positioned on a top surface of the heat source system 246. As described above, the auxiliary button system 300 may be integrated with the heat source system 246, or may be removably (or operationally) attachable to the heat source system 246.

In some embodiments, the heat source system 246/auxiliary button module 315 is configured to wirelessly transmit the indicated operation instruction to the electronic cookbook 230. In such embodiments, the heat source system 246 may be separate from the electronic cookbook 230. In additional embodiments, the heat source system 246/auxiliary button module 315 is configured to wirelessly transmit the indicated operation instruction to an electronic cookbook 230 that is not separate from the electronic cookbook 230.

In some embodiments, the electronic cookbook 230 and the heat source system 246 are configured to be electrically coupled via a wired connection. For example, the illustrated heat source system 246 may include a display 355 that is integrated into and/or wired into the heat source system 246. This display 355 may display the electronic cookbook 230 to the user on the heat source system 246. In such an example, the electronic cookbook 230 may be installed on (and be executed by) a processor in the heat source system 246. In another example, the electronic cookbook 230 may be installed on (and be executed by) a separate device that transmits the displays of the electronic cookbook 230 to the display 355 on the heat source system 246. In some examples, the wired connection may further electrically connect to the auxiliary button module 315 such that the communication circuitry 331 may transmit the indicated operation (e.g., signal) to the electronic cookbook 230 over the wired connection.

The interface 319, operation circuitry 327, communication circuitry 331, and power source 335 may be shared with or separate from an interface, operation circuitry, communication circuitry, and power source of the heat source system 246. In one embodiment, the communication circuitry 331 of the auxiliary button system 300 may operate in conjunction with the communication circuitry of the heat source system 246 such that the indicated operation instruction (e.g., signal) may be transmitted to the electronic cookbook 230 via the connection established between the heat source system 246 and the electronic cookbook 230.

Figure 11:
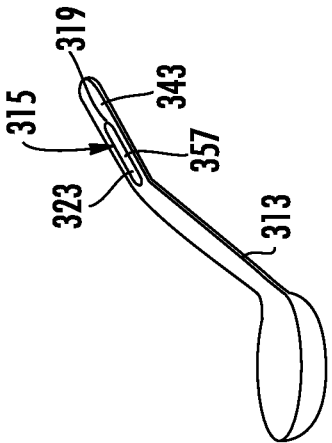
FIG. 11 illustrates an auxiliary button system where the auxiliary device is a cooking utensil, according to various embodiments.

FIG. 11 illustrates one embodiment of an auxiliary button system 300, where the auxiliary device 313 is a cooking utensil. As is illustrated, the auxiliary device 313 is a spoon. However, the auxiliary device 313 may be any other cooking utensil, such as a fork, a knife, tongs, a spatula, a measurement probe, etc. The interface 319 comprising one or more auxiliary buttons 323 may be positioned along the handle of the cooking utensil or any other location that allows the user to conveniently indicate an operation. Once indicated, the operation may be wirelessly transmitted to the electronic cookbook 230.

As described above, the auxiliary button system 300 may be integrated with the cooking utensil, or may be removably (or operationally) attachable to the cooking utensil. The auxiliary button module 315 further includes a notification device 357 energizable to provide a notification or to prompt a user, which may include blinking, color changes, change in intensity, or other features, as described above. In other embodiments, the auxiliary button module 315 does not include a notification device 357. In some such embodiments, a notification device 357 may be provided along the device body 343 of the cooking utensil or another component of the cooking system. In one embodiment, the cooking system 210 does not include a notification device 357.

Figure 12:
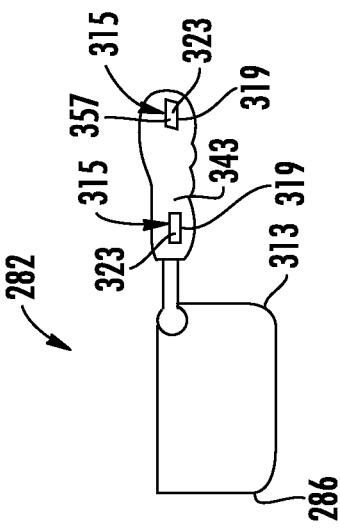
FIG. 12 illustrates an auxiliary button system where the auxiliary device is a cooking device, according to various embodiments.

FIG. 12 illustrates one embodiment of an auxiliary button system 300, where the auxiliary device 313 is a cooking device 286. The cooking device 286 may be a smart cooking vessel configured for operation within a cooking device system 282, for example. In any event, the cooking device 286 may or may not be a component of a cooking device system 282 that is being used in conjunction with the recipe being executed by the electronic book 230. Additionally, the cooking device 286 may be any device that may support, hold, or enclose a food item while it is being cooked, such as a pot, a pan, a vessel, a tray, a grill platen, a grate, an oven, a pressure cooker, a rice cooker, or a slow cooker, for example. As illustrated, the cooking device 286 is a pot.

As is illustrated, the cooking device 286 includes an auxiliary button system 300 having an interface 319. The interface 319 comprising the auxiliary button 323 may be positioned along the handle of the cooking device 286 at a location allowing the user to conveniently indicate an operation instruction. The illustrated embodiment provides an example of an interface 319 that includes two or more auxiliary buttons 323 that are located at different regions of the auxiliary device surface (e.g., the handle). In other embodiments, however, the interface 319 comprises one or more auxiliary buttons 323 located in a same region of the handle. As described above, the auxiliary button system 300 may be integrated with the cooking device 286, or may be removably (or operationally) attachable to the cooking device 286.

In some embodiments, the cooking device 286 is configured to wirelessly transmit the indicated operation instruction to the electronic cookbook 230. In embodiments where the cooking device 286 is a smart cooking vessel, the interface 319, operation circuitry 327, communication circuitry 331, and power source 335 may be shared with or separate from an interface, operation circuitry, communication circuitry, and power source of the cooking device 286. In one embodiment, the communication circuitry 331 of the auxiliary button system 300 may operate in conjunction with the communication circuitry of the cooking device 286 such that the indicated operation (e.g., signal) may be transmitted to the electronic cookbook 230 via a connection established between the electronic cookbook 230 and the cooking device 286 or between the electronic cookbook 230 and the cooking device system 282. For example, the communication circuitry 331 may transmit the signal to the electronic cookbook 230 within a connection, format, pairing, network, or signal transmitted or established between the electronic cookbook 230 and the cooking device 286 (or cooking device system 282). In one such embodiment or a different embodiment, the cooking device 286 (or the cooking device system 282) or the communication circuitry 331 of the auxiliary button system 300 may communicate the signal to a component of the heat source system 242 for routing to the electronic cookbook 230.

The auxiliary button module 315 further includes a notification device 357 energizable to provide a notification or to prompt a user, which may include blinking, color changes, change in intensity, or other features, as described above. In other embodiments, the auxiliary button module 315 does not include a notification device 357. In some such embodiments, a notification device 357 may be provided along the device body 343 of the cooking device 286 or another component of the cooking system. In one embodiment, the cooking system 210 does not include a notification device 357.

Figure 13:
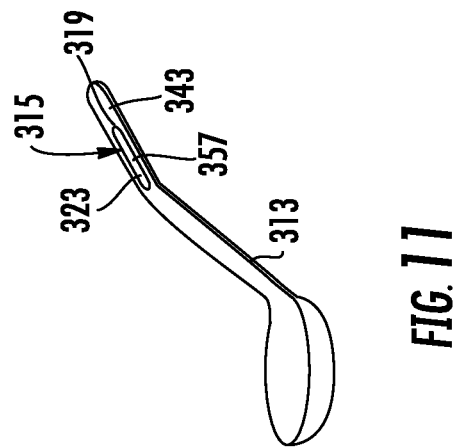
FIG. 13 illustrates an auxiliary button system where the auxiliary device is a heat source system that includes an induction burner, according to various embodiments.

FIG. 13 illustrates one embodiment of an auxiliary button system 300, where the auxiliary device 313 is a heat source system 246 that includes an induction burner (e.g., a cooking base having an induction burner heat source 250). In operation, the heat source system 246 may or may not be an induction burner being used in conjunction with the recipe that is executed by the electronic cookbook 230. As is illustrated, the induction burner includes an auxiliary button system 300 having an interface 319.

The interface 319 comprises one or more auxiliary buttons 323 positioned along the surface of the device body 343 at a location that allows the user to conveniently indicate an operation instruction. As shown, the interface 319 includes two auxiliary buttons 323 positioned along a perimeter of the induction burner. In another embodiment, additional or fewer auxiliary buttons 323 may be used.

As described above, the auxiliary button system 300 may be integrated with the induction burner, or may be removably (or operationally) attachable to the induction burner. In some embodiments, the heat source system 246 (e.g., induction burner) is configured to wirelessly transmit the indicated operation instruction to the electronic cookbook 230. In some embodiments, the electronic cookbook 230 and induction burner are configured to electrically couple via a wired connection. For example, the induction burner may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The interface 319, operation circuitry 327, communication circuitry 331, and power source 335 may be shared with or separate from an interface, operation circuitry, communication circuitry, and power source of the induction burner. In one embodiment, the communication circuitry 331 of the auxiliary button system 300 may operate in conjunction with the communication circuitry of the induction burner such that the indicated operation instruction, (e.g., signal) may be transmitted to the electronic cookbook 230 via the connection established between the induction burner and the electronic cookbook 230. For example, the communication circuitry 331 may transmit the signal to the electronic cookbook 230 within a connection, format, pairing, network, or signal transmitted or established between the electronic cookbook 230 and the induction burner.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the induction burner. In one embodiment, the auxiliary button module 315 does not include a notification device 357.

Figure 14:
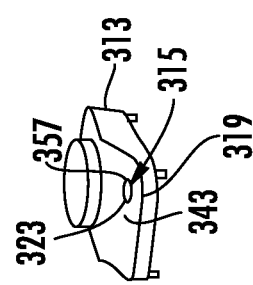
FIG. 14 illustrates an auxiliary button system where the auxiliary device is a cooking appliance, according to various embodiments.

FIG. 14 illustrates an embodiment of an auxiliary button system 300, where the auxiliary device 313 is a cooking appliance. The auxiliary device 313 may be any cooking appliance, such as a microwave, a blender, a mixer, a scale, or any other cooking appliance. As illustrated, the auxiliary device 313 is a scale. The scale includes an auxiliary button system 300 having an interface 319.

The interface 319 comprises one or more auxiliary buttons 323 positioned along the surface of the device body 343 at a location that allows the user to conveniently indicate an operation instruction. As described above, the auxiliary button system 300 may be integrated with the cooking appliance, or may be removably (or operationally) attachable to the cooking appliance.

In some embodiments, the cooking appliance is configured to wirelessly transmit the indicated operation instruction to the electronic cookbook 230. In some embodiments, the electronic cookbook 230 and cooking appliance are configured to electrically couple via a wired connection. For example, the cooking appliance may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The interface 319, operation circuitry 327, communication circuitry 331, and power source 335 may be shared with or separate from an interface, operation circuitry, communication circuitry, and power source of the cooking appliance. In one embodiment, the communication circuitry 331 of the auxiliary button system 300 may operate in conjunction with the communication circuitry of the cooking appliance such that the indicated operation instruction, (e.g., signal) may be transmitted to the electronic cookbook 230 via the connection established between the cooking appliance and the electronic cookbook 230. For example, the communication circuitry 331 may transmit the signal to the electronic cookbook 230 within a connection, format, pairing, network, or signal transmitted or established between the electronic cookbook 230 and the cooking appliance. In one such embodiment or a different embodiment, the cooking appliance or the communication circuitry 331 of the auxiliary button system 300 may communicate the signal to a component of the heat source system 242/cooking device system 282 for routing to the electronic cookbook 230.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the cooking appliance. In one embodiment, the cooking system 210 does not include a notification device 357.

Figure 15:
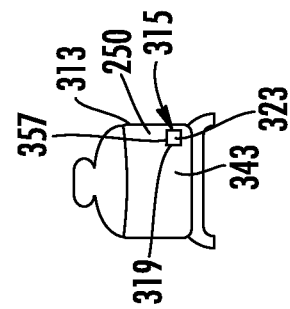
FIG. 15 illustrates an auxiliary button system where the auxiliary device is a cooking vessel, according to various embodiments.

FIG. 15 illustrates an embodiment of an auxiliary button system 300, where the auxiliary device 313 is a cooking vessel. As is illustrated, the cooking vessel is a slow cooker. However, the cooking vessel may be any other type of cooking vessel, such as a rice cooker, a waffle maker, or a Panini press. In some examples, the cooking vessel may be a smart cooking vessel configured for operation within a cooking device system 282. In any event, in operation, the cooking vessel may or may not be a component of a cooking device system 282 that is being used in conjunction with the recipe being executed by the electronic book. As is illustrated, the cooking vessel includes an auxiliary button system 300 having an interface 319.

The interface 319 comprises one or more auxiliary buttons 323 positioned along the surface of the device body 343 at a location that allows the user to conveniently indicate an operation instruction. As described above, the auxiliary button system 300 may be integrated with the cooking vessel, or may be removably (or operationally) attachable to the vessel.

In some embodiments, the cooking vessel is configured to wirelessly transmit the indicated operation instruction to the electronic cookbook 230. In some embodiments, the electronic cookbook 230 and cooking vessel are configured to electrically couple via a wired connection. For example, the cooking vessel may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The interface 319, operation circuitry 327, communication circuitry 331, and power source 335 may be shared with or separate from an interface, operation circuitry, communication circuitry, and power source of the cooking vessel. In one embodiment, the communication circuitry 331 of the auxiliary button system 300 may operate in conjunction with the communication circuitry of the cooking vessel such that the indicated operation instruction, (e.g., signal) may be transmitted to the electronic cookbook 230 via the connection established between the cooking vessel and the electronic cookbook 230. For example, the communication circuitry 331 may transmit the signal to the electronic cookbook 230 within a connection, format, pairing, network, or signal transmitted or established between the electronic cookbook 230 and the cooking vessel. In one such embodiment or a different embodiment, the cooking vessel or the communication circuitry 331 of the auxiliary button system 300 may communicate the signal to a component of the heat source system 242/cooking device system 282 for routing to the electronic cookbook 230.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the cooking vessel. In one embodiment, the cooking system 210 does not include a notification device 357.

Figure 16:
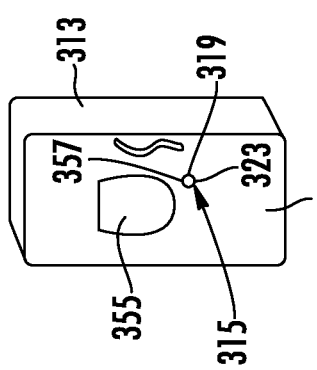
FIG. 16 illustrates an auxiliary button system where the auxiliary device is an appliance, according to various embodiments.

FIG. 16 illustrates an embodiment of an auxiliary button system 300 where the auxiliary device 313 is an appliance. As is illustrated, the appliance is a refrigerator. However, the appliance may be any other type of appliance, such as a dishwasher, a wine cooler, or a vent hood. As is illustrated, the cooking vessel includes an auxiliary button system 300 having an interface 319.

The interface 319 comprises one or more auxiliary buttons 323 positioned along the surface of the device body 343 at a location that allows the user to conveniently indicate an operation instruction. As described above, the auxiliary button system 300 may be integrated with the appliance, or may be removably (or operationally) attachable to the appliance.

In some embodiments, the appliance is configured to wirelessly transmit the indicated operation instruction to the electronic cookbook 230. In some embodiments, the electronic cookbook 230 and appliance are configured to electrically couple via a wired connection. For example, the appliance may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The interface 319, operation circuitry 327, communication circuitry 331, and power source 335 may be shared with or separate from an interface, operation circuitry, communication circuitry, and power source of the appliance. In one embodiment, the communication circuitry 331 of the auxiliary button system 300 may operate in conjunction with the communication circuitry of the appliance such that the indicated operation instruction, (e.g., signal) may be transmitted to the electronic cookbook 230 via the connection established between the appliance and the electronic cookbook 230. For example, the communication circuitry 331 may transmit the signal to the electronic cookbook 230 within a connection, format, pairing, network, or signal transmitted or established between the electronic cookbook 230 and the appliance. In one such embodiment or a different embodiment, the appliance or the communication circuitry 331 of the auxiliary button system 300 may communicate the signal to a component of the heat source system 242/cooking device system 282 for routing to the electronic cookbook 230.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the appliance. In one embodiment, the cooking system 210 does not include a notification device 357.

As is also illustrated, the appliance may include a display 355 that is integrated into and/or wired into the appliance. This display 355 may display the electronic cookbook 230 to the user on the appliance. In such an example, the electronic cookbook 230 may be installed on (and be executed by) a processor in the appliance. In another example, the electronic cookbook 230 may be installed on (and be executed by) a separate device that transmits the displays of the electronic cookbook 230 to the display 355 on the appliance.

Figure 17:
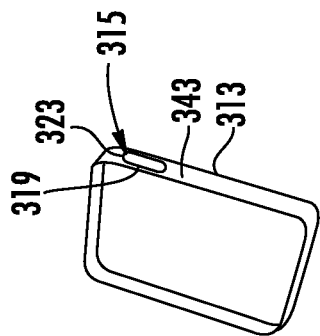
FIG. 17 illustrates an auxiliary button system where the auxiliary device is a support device, according to various embodiments.

FIG. 17 illustrates an embodiment of an auxiliary button system 300 where the auxiliary device 313 is a support device. As is illustrated, the support device is a stand that may support the electronic cookbook 230 (such as a stand for the computing device 214 executing the electronic cookbook 230). However, the support device may be any other type of support device, such as a cover, a charging unit, a casing, or any other support device. Additionally, although the support device is illustrated as supporting the electronic cookbook 230, the support device may support any other device (such as an additional display unit). In the illustrated embodiment, the stand includes a cover locatable over a display surface to prevent damage and assist in cleaning. The cover may be removable or may define a slot dimensioned to receive the electronic cookbook 230 or other computing device 214.

As is illustrated, the support device includes an auxiliary button system 300 having an interface 319. The interface 319 comprises one or more auxiliary buttons 323 positioned along the surface of the device body 343 at a location that allows the user to conveniently indicate an operation instruction. As described above, the auxiliary button system 300 may be integrated with the support device, or may be removably (or operationally) attachable to the device.

In some embodiments, the support device is configured to wirelessly transmit the indicated operation instruction to the electronic cookbook 230. In some embodiments, the electronic cookbook 230 and support device are configured to electrically couple via a wired connection. For example, the support device may include a fitting to electrically couple with the electronic cookbook 230 over a wired connection. In such an example, the support device may hold the electronic cookbook 230 while also providing the electrical coupling. The wired connection may further electrically connect to the auxiliary button module 315 such that the communication circuitry 331 may transmit the indicated operation (e.g., signal) to the electronic cookbook 230 over a wired connection.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the support device. In one embodiment, the cooking system 210 does not include a notification device 357.

Figure 18:
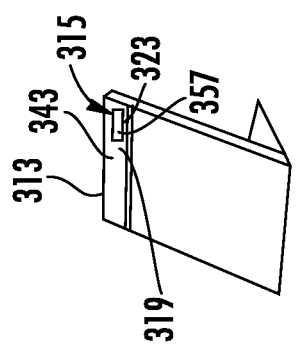
FIG. 18 illustrates an auxiliary button system where the auxiliary device is another example of a support device, according to various embodiments.

FIG. 18 illustrates an embodiment of an auxiliary button system 300 where the auxiliary device 313 is another example of a support device. As is illustrated, the support device is a case (or casing) that may support the electronic cookbook 230 (such as a case for the computing device 214 executing the electronic cookbook 230). However, the support device may be any other type of support device, such as a cover or a charging unit. Additionally, although the support device is illustrated as supporting the electronic cookbook 230, the support device may support any other device (such as an additional display unit, a separate display unit, or any other device, which may or may not have an operative role in the execution of the electronic cookbook 230 or recipe).

As is illustrated, the support device includes an auxiliary button system 300 having an interface 319. The interface 319 comprises one or more auxiliary buttons 323 positioned along the surface of the device body 343 at a location that allows the user to conveniently indicate an operation instruction. As described above, the auxiliary button system 300 may be integrated with the support device, or may be removably (or operationally) attachable to the device.

In some embodiments, the support device is configured to wirelessly transmit the indicated operation instruction to the electronic cookbook 230. In some embodiments, the electronic cookbook 230 and support device are configured to electrically couple via a wired connection. For example, the support device may include a fitting to electrically couple with the electronic cookbook 230 over a wired connection. In such an example, the support device may hold the electronic cookbook while also providing the electrical coupling. The wired connection may further electrically connect to the auxiliary button module 315 such that the communication circuitry 331 may transmit the indicated operation (e.g., signal) to the electronic cookbook 230 over a wired connection.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the support device. In one embodiment, the cooking system 210 does not include a notification device 357.

Figure 19:
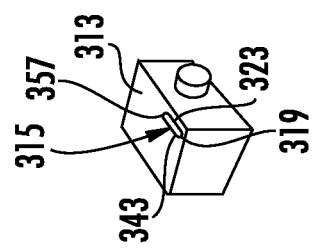
FIG. 19 illustrates an auxiliary button system where the auxiliary device is a display device, according to various embodiments.

FIG. 19 illustrates an embodiment of an auxiliary button system 300 where the auxiliary device 313 is a display device. As is illustrated, the display device is a projector. However, the display device may be any other type of display device, such as a television, a computer, or a phone display.

As is illustrated, the display device includes an auxiliary button system 300 having an interface 319. The interface 319 comprises one or more auxiliary buttons 323 positioned along the surface of the device body 343 at a location that allows the user to conveniently indicate an operation instruction. As described above, the auxiliary button system 300 may be integrated with the display device, or may be removably (or operationally) attachable to the display device.

In some embodiments, the display device is configured to wirelessly transmit the indicated operation instruction to the electronic cookbook 230. In some embodiments, the electronic cookbook 230 and display device are configured to electrically couple via a wired connection. For example, the display device may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the display device. In one embodiment, the cooking system 210 does not include a notification device 357.

Figure 20:
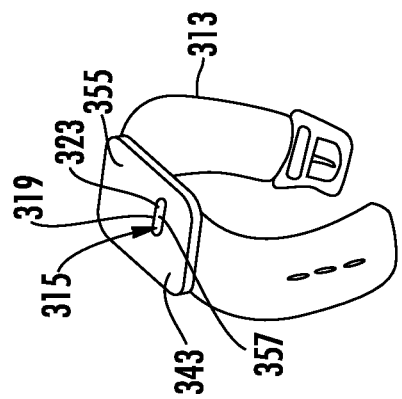
FIG. 20 illustrates an auxiliary button system where the auxiliary device is a wearable device, according to various embodiments.

FIG. 20 illustrates an embodiment of an auxiliary button system 300 where the auxiliary device is a wearable device. As is illustrated, the wearable device is a watch (such as a smart watch). However, the wearable device may be any other wearable device, such as a bracelet, ring, necklace, belt, or apron. In some embodiments, the wearable may comprise a display device configured to provide an additional or separate display.

As is illustrated, the wearable device includes an auxiliary button system 300 having an interface 319. The interface 319 comprises one or more auxiliary buttons 323 positioned along the outer surface of the device body 343 at a location that allows the user to conveniently indicate an operation instruction. As described above, the auxiliary button system 300 may be integrated with the wearable device, or may be removably (or operationally) attachable to the wearable device.

In some embodiments, the wearable device is configured to wirelessly transmit the indicated operation instruction to the electronic cookbook 230. In some embodiments, the electronic cookbook 230 and wearable device are configured to electrically couple via a wired connection. For example, the wearable device may include a processor that executes the electronic cookbook.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of the wearable device. In one embodiment, the cooking system 210 does not include a notification device 357.

Figure 21:
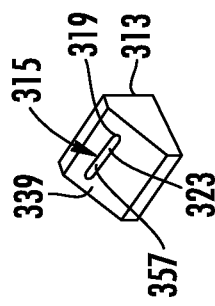
FIG. 21 illustrates an auxiliary button system where the auxiliary button module is configured for use as a standalone device, according to various embodiments.

FIG. 21 illustrates an embodiment of an auxiliary button system 300 where the auxiliary button module 315 is configured for use as a standalone device. As a standalone device, the auxiliary button module 315 does not need to be attached to an auxiliary device 313 in order for a user to provide an indication of an operation to the electronic cookbook 230. Instead, the auxiliary button module 315 may be portable, so that it may be carried around by a user (or moved to multiple locations) throughout the execution of the recipe. Additionally, the user may position the auxiliary button module 315 on a desired surface (such as on a countertop, or on or in an auxiliary device 313) during use, or the auxiliary button module 315 may be held by the user during use. Furthermore, the auxiliary button module 315 may be subsequently stored when not in use.

As is illustrated, the auxiliary button module 315 has an interface 319. The interface 319 comprises one or more auxiliary buttons 323 positioned along the surface of the device body 339 at a location that allows the user to conveniently indicate an operation instruction. As is discussed above, the auxiliary button module 315 is configured for use as a standalone device. However, as is also described above, the auxiliary button module 315 may be integrated with an auxiliary device 313, or may be removably (or operationally) attachable to an auxiliary device 313.

In some embodiments, the auxiliary button module 315 is configured to wirelessly transmit the indicated operation instruction to the electronic cookbook 230. In some embodiments, the electronic cookbook 230 and auxiliary button module 315 are configured to electrically couple via a wired connection. For example, the auxiliary button module 315 may include a fitting to electrically couple with the electronic cookbook 230 over a wired connection. The wired connection may further electrically connect to the auxiliary button module 315 such that the communication circuitry 331 may transmit the indicated operation (e.g., signal) to the electronic cookbook 230 over a wired connection.

The auxiliary button module 315 further includes a notification device 357 energizable to provide notification or to prompt a user, which may include blinking, color changes, change in intensity, or other features, as described above. The notification device may comprise an LED light underlying or otherwise positioned to illuminate the auxiliary button 323. When illuminated, the LED light may blink for example to notify the user. In other embodiments, the auxiliary button module 315 does not include a notification device 357. In some such embodiments, a notification device 357 may be provided along the device body 343 of auxiliary device 313 to which the auxiliary button module 315 is attached to. In one embodiment, the cooking system 210 does not include a notification device 357.

Modifications, additions, and/or substitutions may be made to the cooking system 10 and/or the cooking system 210, the components of the cooking system 10 and/or the cooking system 210, and/or the functions of the cooking system 10 and/or the cooking system 210 without departing from the scope of the specification. For example, the cooking system 10 may include one or more (or all) of the components, functionalities, and/or abilities described (and/or claimed) in U.S. Patent Application Publication No. 2016/0051078 entitled "Automated Cooking Control Via Enhanced Cooking Equipment," which is incorporated herein by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This disclosure describes various elements, features, aspects, and advantages of various embodiments, configurations, and arrangements of the oven systems, apparatuses, and methods thereof. It is to be understood that certain descriptions of the various embodiments and such configurations and arrangements thereof have been simplified to illustrate only those elements, features and aspects that are relevant to a more clear understanding of the disclosed embodiments, while eliminating, for purposes of brevity or clarity, other elements, features and aspects. Any references to "various," "certain," "some," "one," or "an" when followed by "embodiment," "configuration," or "arrangement" generally means that a particular element, feature or aspect described in the example is included in at least one embodiment. The phrases "in various," "in certain," "in some," "in one," or "in an" when followed by "embodiment", "configuration", or "arrangement" may not necessarily refer to the same embodiment. Furthermore, the phrases "in one such" or "in this" when followed by "embodiment," "configuration," or "arrangement," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. For example, ovens and oven systems described herein may also include connections such as fittings for one or more of electrical connections, gas connections, or flue connections. As such, it is to be understood that the description set forth herein is merely exemplary and illustrative of the disclosed embodiments and is not intended to limit the scope of the invention as defined solely by the claims.

What is claimed is:

1. A system, comprising:
   a. a computing device having a processor that is operable, when executed, to:
      i. display a first portion of a cooking recipe having a plurality of steps on a display of the computing device, the first portion of the cooking recipe being associated with a first step of the cooking recipe;
      ii. establish a first communication link with a heat source system to be used to cook a food item in accordance with the cooking recipe;
   b. the heat source system, comprising:
      i. a heat source operable to provide an amount of energy to be used to cook the food item in accordance with the cooking recipe; and
      ii. a processor communicatively coupled to the heat source, and operable, when executed, to:
         1. receive, via the first communication link with the computing device, an indication of a first temperature associated with the first step of the cooking recipe; and
         2. based on the indication of the first temperature, adjust the amount of energy provided by the heat source;
   c. an auxiliary button system, comprising:
      i. an interface operable to receive, via touch, an instruction to move from the first step of the cooking recipe to a second step of the cooking recipe; and
      ii. a processor communicatively coupled to the interface, and operable, when executed, to:
         1. establish a second communication link with the computing device; and
         2. transmit, via the second communication link with the computing device, an indication of the instruction to move from the first step of the cooking recipe to the second step of the cooking recipe;
   d. wherein the processor of the computing device is further operable to:
      i. receive, via the second communication link with the auxiliary button system, the indication of the instruction to move from the first step of the cooking recipe to the second step of the cooking recipe; and
      ii. following receipt of the indication of the instruction, display a second portion of the cooking recipe on the display of the computing device, the second portion of the cooking recipe being associated with the second step of the cooking recipe;
   e. wherein the auxiliary button system is separate from the computing device; and
   f. wherein the computing device is separate from the heat source system.

2. The system of claim 1, wherein the processor of the heat source system is further operable, when executed, to:
   a. receive, via the first communication link with the computing device, an indication of a second temperature associated with the second step of the cooking recipe; and
   b. based on the indication of the second temperature, further adjust the amount of energy provided by the heat source.

3. A system, comprising:
   a. a computing device having a processor that is operable, when executed, to display a first portion of a cooking recipe having a plurality of steps on a display of the computing device, the first portion of the cooking recipe being associated with a first step of the cooking recipe;
   b. a heat source system, comprising:
      i. a heat source operable to provide an amount of energy to be used to cook a food item in accordance with the cooking recipe; and
      ii. a processor communicatively coupled to the heat source, and operable, when executed, to adjust the amount of energy provided by the heat source based on one or more communications with the computing device via a first communication link;
   c. an auxiliary button system, comprising:
      i. an interface operable to receive, via touch, an instruction to move from the first step of the cooking recipe to a second step of the cooking recipe; and
      ii. a processor communicatively coupled to the interface, and operable, when executed, to transmit, via a second communication link with the computing device, an indication of the instruction to move from the first step of the cooking recipe to the second step of the cooking recipe;
   d. wherein the auxiliary button system is separate from the computing device; and
   e. wherein the computing device is separate from the heat source system.

4. The system of claim 3, wherein the processor of the computing device is further operable to:
   a. receive, via the second communication link with the auxiliary button system, the indication of the instruction to move from the first step of the cooking recipe to the second step of the cooking recipe; and
   b. following receipt of the indication of the instruction, display a second portion of the cooking recipe on the display of the computing device, the second portion of the cooking recipe being associated with the second step of the cooking recipe.

5. The system of claim 4, wherein the processor of the heat source system is further operable, when executed, to further adjust the amount of energy provided by the heat source based on one or more additional communications with the computing device via the first communication link.

6. The system of claim 3, wherein the auxiliary button system further comprises:
   a. an auxiliary device; and
   b. an auxiliary button module coupled to the auxiliary device, the auxiliary button module including the interface.

7. The system of claim 6, wherein the auxiliary button module is integrated with the auxiliary device.

8. The system of claim 6, wherein the auxiliary button module further includes the processor of the auxiliary button system, wherein the auxiliary button module is removable from the auxiliary device and operable to be used as a standalone device.

9. The system of claim 6, wherein the auxiliary device comprises one selected from the group comprising a cooking appliance, a cooking vessel, a cooking surface, a cooking utensil, a support system, an auxiliary display, or a wearable device.

10. The system of claim 6, wherein the auxiliary device comprises the heat source system.

11. The system of claim 3, wherein at least a portion of the auxiliary button system is washable with water.

12. The system of claim 3, wherein the second step of the cooking recipe is a step that is subsequent to the first step of the cooking recipe or prior to the first step of the cooking recipe.

* * * * *